US012650665B2

(12) United States Patent
Kyotani

(10) Patent No.: US 12,650,665 B2
(45) Date of Patent: Jun. 9, 2026

(54) IMAGE FORMING APPARATUS CONFIGURED TO PERFORM INITIALIZATION PROCESS FOR FIRST CONSUMABLE AND SECOND CONSUMABLE ATTACHED TO MAIN CASING IN ACCORDANCE WITH RECEIVED INSTRUCTION

(71) Applicant: BROTHER KOGYO KABUSHIKI KAISHA, Nagoya (JP)

(72) Inventor: Tadao Kyotani, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/033,722

(22) Filed: Jan. 22, 2025

(65) Prior Publication Data

US 2025/0164907 A1 May 22, 2025

Related U.S. Application Data

(63) Continuation of application No. PCT/JP2023/024359, filed on Jun. 30, 2023.

(30) Foreign Application Priority Data

Jul. 28, 2022 (JP) ................................ 2022-120764

(51) Int. Cl.
*G03G 21/18* (2006.01)
*G03G 15/00* (2006.01)
*G03G 15/08* (2006.01)

(52) U.S. Cl.
CPC ..... *G03G 21/1875* (2013.01); *G03G 15/0863* (2013.01); *G03G 15/5016* (2013.01);
(Continued)

(58) Field of Classification Search
CPC .......... G03G 15/0863; G03G 15/5016; G03G 15/55; G03G 15/553; G03G 15/556;
(Continued)

(56) References Cited

U.S. PATENT DOCUMENTS 5,860,363 A 1/1999 Childers et al.
6,914,696 B1 * 7/2005 Kojima ............... G03G 15/553 358/1.14

(Continued)

FOREIGN PATENT DOCUMENTS

JP 10-202900 A 8/1998
JP 2005-141093 A 6/2005

(Continued)

OTHER PUBLICATIONS

International Search Report issued in related international patent application PCT/JP2023/024359, Sep. 12, 2023.

*Primary Examiner* — Joseph S Wong
(74) *Attorney, Agent, or Firm* — Merchant & Gould P.C.

(57) ABSTRACT

An image forming apparatus includes: a main casing to which a first consumable including a first consumable memory and a second consumable including a second consumable memory are attached; a controller; and a main memory. The first consumable memory stores therein first lifetime information related to a service life of the first consumable. The second consumable memory stores therein second lifetime information related to a service life of the second consumable. The controller is configured to perform: a reception process to receive an instruction to initialize the first lifetime information and the second lifetime information; an initialization process to initialize the first lifetime information and the second lifetime information; and a write process to write first initialization information indicating that the first lifetime information was initialized in the first consumable memory and to write second initialization information indicating that the second lifetime information was initialized in the second consumable memory.

30 Claims, 11 Drawing Sheets

(52) U.S. Cl.
CPC ........... *G03G 15/55* (2013.01); *G03G 15/553* (2013.01); *G03G 15/556* (2013.01); *G03G 21/1878* (2013.01); *G03G 21/1882* (2013.01); *G03G 21/1889* (2013.01)

(58) Field of Classification Search
CPC ........... G03G 21/1875; G03G 21/1878; G03G 21/1882; G03G 21/1889
See application file for complete search history.

(56) References Cited

U.S. PATENT DOCUMENTS

| | | | | |
|---|---|---|---|---|
| 9,415,601 | B1 | 8/2016 | Tsukida | |
| 2012/0327451 | A1* | 12/2012 | Miller | G03G 15/0863 358/1.14 |
| 2014/0240779 | A1* | 8/2014 | Miller | B41J 2/17546 358/1.15 |
| 2020/0073306 | A1 | 3/2020 | Sakaguchi | |
| 2021/0252869 | A1 | 8/2021 | Kishimoto | |

FOREIGN PATENT DOCUMENTS

| | | | |
|---|---|---|---|
| JP | 2016-185623 | A | 10/2016 |
| JP | 2020-038239 | A | 3/2020 |
| JP | 2021-130229 | A | 9/2021 |

* cited by examiner

| CARTRIDGE ID | RECYCLE NUMBER |
|---|---|
| TON0001 | 1 |
| DRM0056 | 1 |
| TON0001 | 2 |
| : | : |

IMAGE FORMING APPARATUS CONFIGURED TO PERFORM INITIALIZATION PROCESS FOR FIRST CONSUMABLE AND SECOND CONSUMABLE ATTACHED TO MAIN CASING IN ACCORDANCE WITH RECEIVED INSTRUCTION

REFERENCE TO RELATED APPLICATIONS

This is a by-pass continuation application of International Application No. PCT/JP2023/024359 filed on Jun. 30, 2023 which claims priority from Japanese Patent Application No. 2022-120764 filed on Jul. 28, 2022. The entire contents of the International Application and the priority application are incorporated herein by reference.

BACKGROUND ART

Consumables such as toner cartridges, drum cartridges, and ink cartridges, for example, are attached to image forming apparatuses. Each consumable includes a consumable memory. Lifetime information related to a service life of the consumable and the like is stored in the consumable memory.

For example, a prior art discloses an ink cartridge at which a reset button is provided for resetting contents of a memory mounted on the ink cartridge. A user manually operates the reset button to reset the contents of the memory.

SUMMARY

In order to promote recycling of consumables, it is required that the user can perform initialization for the consumable memory easily without taking complicated steps.

In view of the foregoing, it is an object of the present disclosure to provide an image forming apparatus that can perform initialization for a consumable memory easily.

In order to attain the above and other object, the present disclosure provides an image forming apparatus including: a main casing to which a first consumable and a second consumable are attached; a controller; and a main memory. The first consumable includes a first consumable memory in which first lifetime information is stored. The first lifetime information is related to a service life of the first consumable. The second consumable includes a second consumable memory in which second lifetime information is stored. The second lifetime information is related to a service life of the second consumable. The controller is configured to perform: a reception process to receive an instruction instructing to initialize the first lifetime information and the second lifetime information; an initialization process to initialize the first lifetime information and the second lifetime information in accordance with the received instruction; and a write process to write first initialization information in the first consumable memory and to write second initialization information in the second consumable memory. The first initialization information indicates that the first lifetime information was initialized. The second initialization information indicates that the second lifetime information was initialized.

In the above operation, an instruction instructing to initialize the first lifetime information and the second lifetime information is received in the reception process, and the first lifetime information and the second lifetime information are initialized in the initialization process. That is, a user can easily perform initialization for the first consumable memory of the first consumable and the second consumable memory of the second consumable using the image forming apparatus. Accordingly, the user can easily perform initialization for a plurality of consumable memories with a single instruction using the image forming apparatus.

According to another aspect, the present disclosure also provides an initialization method of initializing a first consumable memory included in a first consumable and a second consumable memory included in a second consumable. The initialization method includes: a reception step, by an image forming apparatus, of receiving an instruction instructing to initialize first lifetime information stored in the first consumable memory of the first consumable attached to a main casing of the image forming apparatus and second lifetime information stored in the second consumable memory of the second consumable attached to the main casing, the first lifetime information being related to a service life of the first consumable, the second lifetime information being related to a service life of the second consumable; an initialization step, by the image forming apparatus, of initializing the first lifetime information and the second lifetime information in accordance with the received instruction; and a write step, by the image forming apparatus, of writing first initialization information in the first consumable memory and of writing second initialization information in the second consumable memory, the first initialization information indicating that the first lifetime information was initialized, the second initialization information indicating that the second lifetime information was initialized.

The initialization method according to the other aspect can exhibit the technical advantages the same as that obtained by the image forming apparatus according to the above aspect.

DESCRIPTION

Embodiment

Hereinafter, an embodiment of the present disclosure will be described while referring to the accompanying drawings. In one example, a case will be described in which image forming apparatuses 1 are laser printers, and image formation is printing in the present embodiment. However, the image forming apparatuses 1 may be printers other than the laser printers. For example, the image forming apparatuses 1 may be inkjet printers.

Overview of Image Formation System

Figure 1:
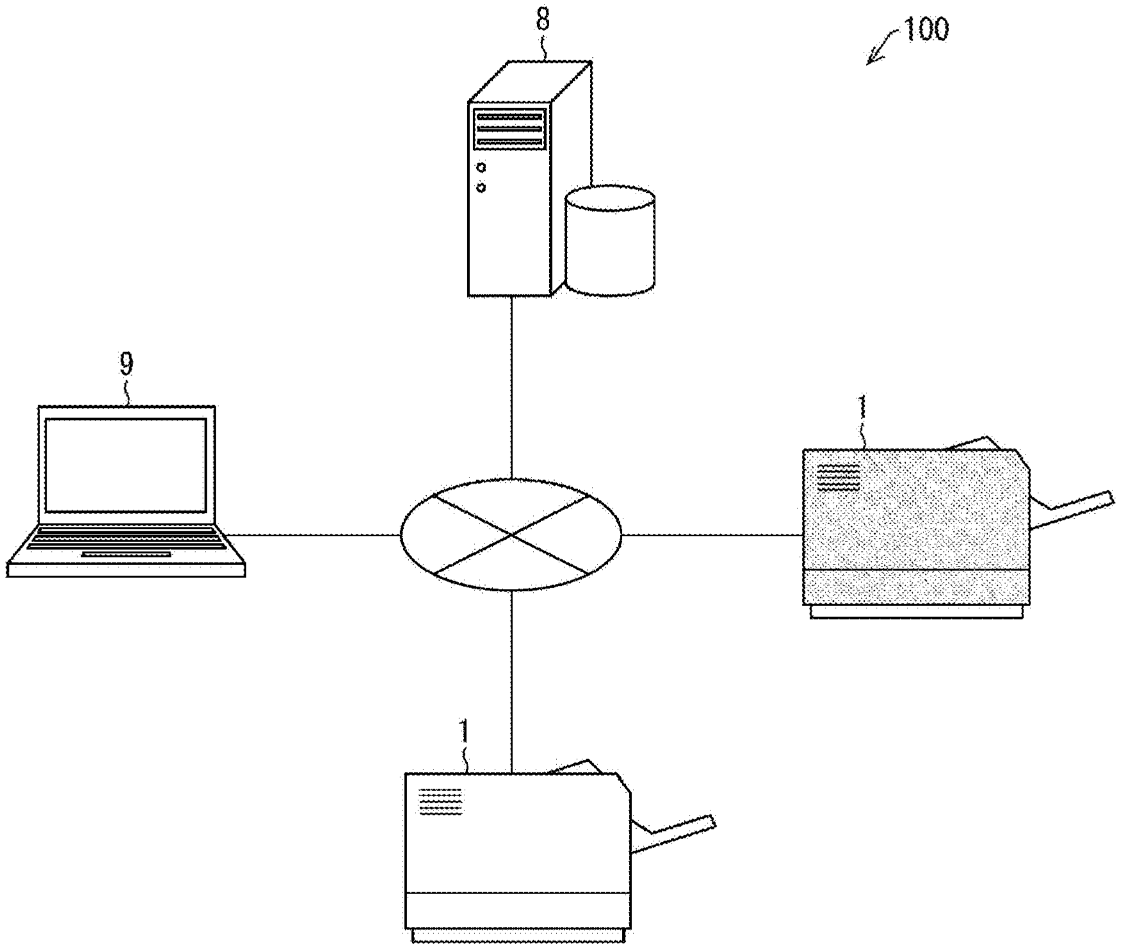
FIG. 1 is a diagram illustrating an overview of an image formation system.

FIG. 1 is a diagram illustrating an overview of an image formation system 100 according to the embodiment of the present disclosure. In the image formation system 100, based on an agreement reached between a company and a user, the company provides the image forming apparatuses 1 of the user with a printing service. Hereinafter, a flat-rate printing service provided based on an agreement will be referred to as "subscription service", and printing that the image forming apparatus 1 performs using the provided subscription service will be referred to as "subscription printing" as distinguished from a normal printing performed independently of the agreement. The normal printing performed independently of the agreement will be hereinafter referred to as "normal printing".

As illustrated in FIG. 1, the image formation system 100 is configured by including a plurality of image forming apparatuses 1, a server 8, and a user terminal 9. Each image forming apparatus 1 used by the user functions as a device that performs the normal printing, and can function as a device that performs the subscription printing when use of the subscription service is permitted as will be described later. The server 8 used by the company is a device for managing the image forming apparatus 1 for which an agreement is reached and which is permitted to use the subscription service. Hereinafter, the image forming apparatus 1 for which an agreement is reached and which is permitted to use the subscription service will be referred to as "contracted machine".

The user terminal 9 used by the user is a device that communicates with the server 8 in order to reach and cancel an agreement and to perform other procedures. An information processing terminal equipped with standard communication functions, such as a PC (personal computer) or a smartphone, can be employed as the user terminal 9. The devices configuring the image formation system 100 can communicate with one another over a communication network such as the Internet.

The plurality of image forming apparatuses 1 illustrated in FIG. 1 may be image forming apparatuses purchased by the same user, or may be image forming apparatuses purchased by different users.

Each of the plurality of image forming apparatuses 1 is an image forming apparatus that can use consumables or replacement components which are exclusively for an agreement by the user reaching the agreement with the company. In an example of the agreement, the company providing the subscription service and the user agree on a usage period, a usage fee, an upper limit number of sheets, and the like of the subscription service, and both parties agree that the company will provide this subscription service with the user. That is, the image forming apparatus 1 according to the present embodiment is an image forming apparatus that can perform the subscription printing, which is printing based on details of the reached agreement, after the agreement for the subscription service is reached.

In the subscription service that the company provides the user, the following (1) and (2) may be performed at different timings in the image formation system 100.

(1) The timing at which the server 8 recognizes the image forming apparatus 1 as the contracted machine for which an agreement is reached.

(2) The timing at which the server 8 recognizes that the image forming apparatus 1 started use of the subscription service.

That is, in the subscription service, there may be a case in which the server 8 recognizes that "the image forming apparatus 1 is the contracted machine, but the use of the subscription service is not yet started".

Note that "the server 8 recognizes the image forming apparatus 1 as the contracted machine" in (1) may be performed to trigger that the image forming apparatus 1 shifts a state from a non-subscription mode indicating that an agreement is not reached to a subscription mode indicating that an agreement is reached.

Further, "recognize that the use of the subscription service is started" in (2) just indicates that the server 8 recognizes that "the use of the subscription service is started from a certain date and time". Therefore, the timing at which the server 8 recognizes that the use of the subscription service is started need not coincide with the timing at which the image forming apparatus 1 actually performed the subscription printing.

Unless otherwise specified, the following description assumes that the subscription service is a paid service. The timing of (1) is a timing at which the server 8 recognizes the image forming apparatus 1 as the contracted machine, and does not serve as a trigger for starting billing. The timing of (2) is assumed to be a timing for starting billing.

As another example, the timing of (1) and the timing of (2) may be approximately simultaneous. For example, (1) and (2) described above may occur triggering that a cartridge (a consumable) which is exclusively for the subscription service and is used for the subscription printing has been attached. Hereinafter, a cartridge which is exclusively for the subscription service and is used for the subscription printing will be referred to as "subscription cartridge". For example, the image forming apparatus 1 reads prescribed information from a cartridge memory of the attached subscription cartridge, and transmits the prescribed information to the server 8. When receiving the prescribed information from the image forming apparatus 1, the server 8 recognizes that the image forming apparatus 1 is the contracted machine and that the use of the subscription service has been started in the image forming apparatus 1.

Note that a display part such as a display or a lamp, and an operation part such as a button are provided at the image forming apparatus 1. The display may be integrally formed with a touch panel to function as the operation part.

Overview of Structure of Image Forming Apparatuses 1

Figure 2:
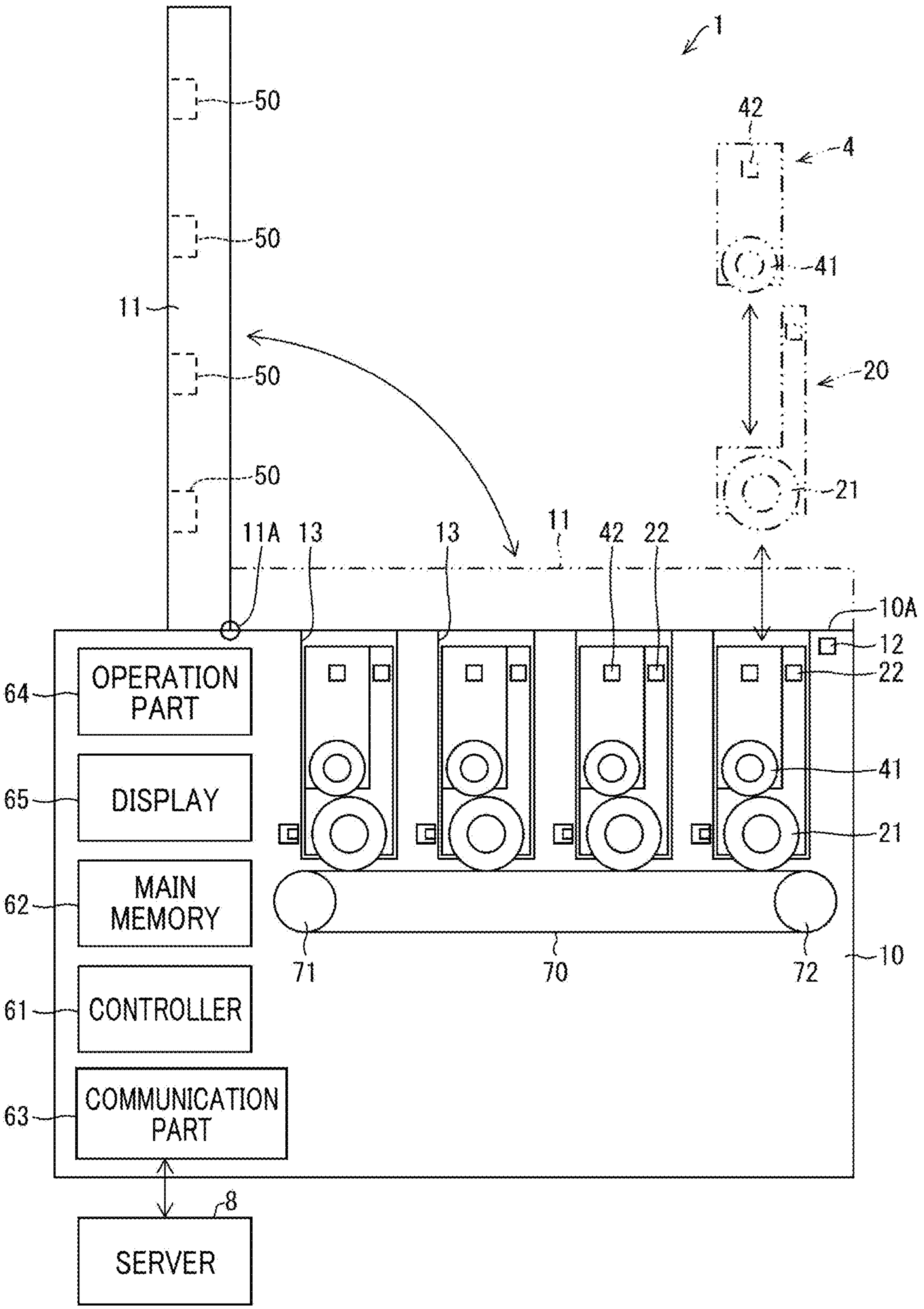
FIG. 2 is a schematic diagram of an image forming apparatus.
Figure 3:
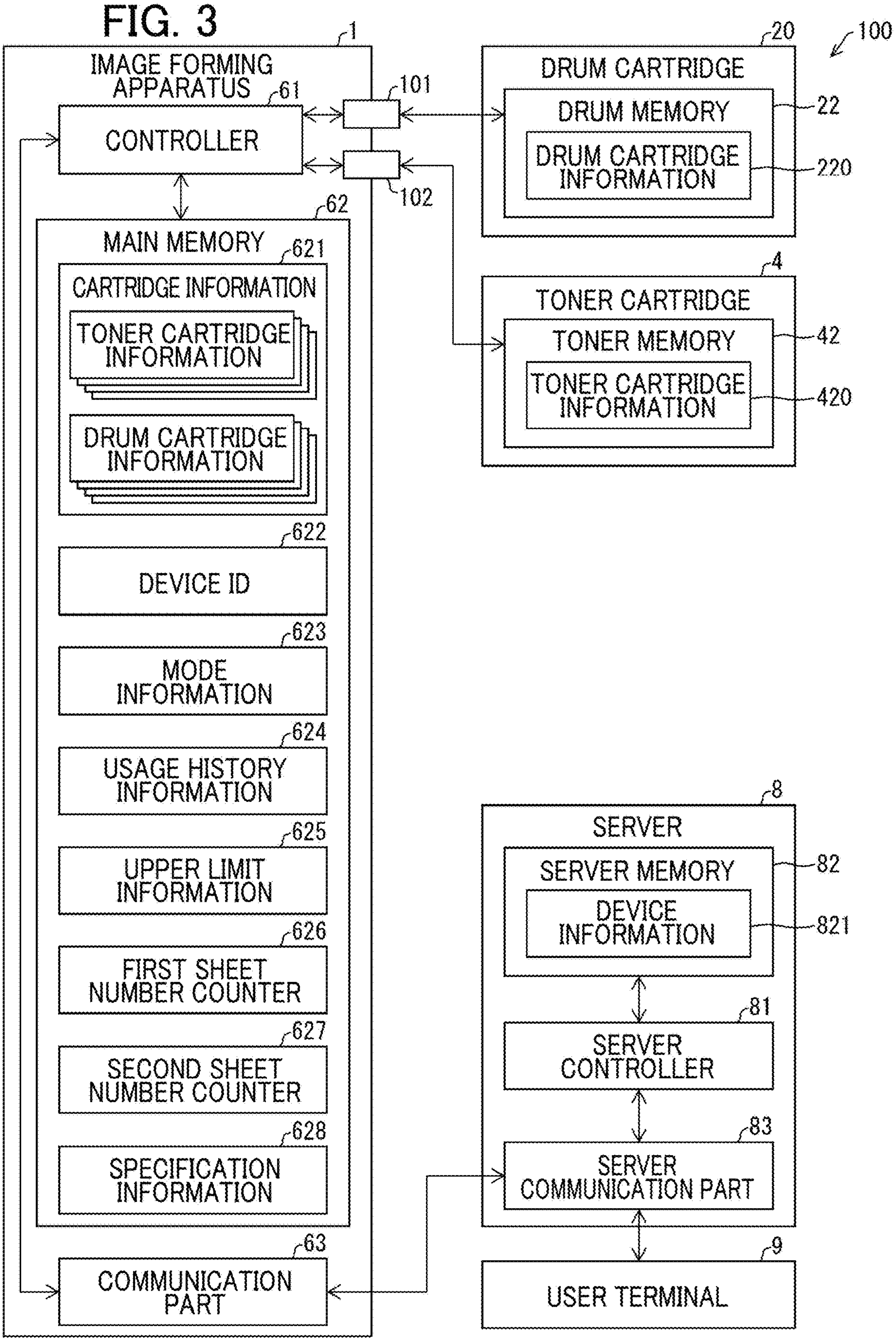
FIG. 3 is a diagram illustrating a structure of a main part of the image forming apparatus including drum cartridges and toner cartridges.

FIG. 2 is a schematic diagram of the image forming apparatus 1. FIG. 3 is a diagram illustrating internal structures of the image forming apparatus 1 including drum cartridges 20 and toner cartridges 4, and the server 8.

As illustrated in FIG. 2, the image forming apparatus 1 is configured of a main casing 10, and a cover 11. Although not illustrated in the drawings, a display part such as a display or a lamp, and an input part such as a button may be provided at the image forming apparatus 1. The display may be integrally formed with a touch panel to function as the input part.

Main Casing 10

The toner cartridges 4 are attached to the main casing 10 of the image forming apparatus 1. As will be described later in detail, each of the toner cartridges 4 is attached to the corresponding drum cartridge 20 to be integrated therewith. That is, in a state where the toner cartridges 4 are attached to the corresponding drum cartridges 20, the toner cartridges 4 are attached to the main casing 10 together with the drum cartridges 20, thereby achieving the image forming apparatus 1 that includes the drum cartridges 20 and the toner cartridges 4.

Note that, in the image forming apparatus 1 according to the present embodiment, four of the toner cartridges 4 need to be attached in order to perform printing. In other words, four of the drum cartridges 20 and four of the toner cartridges 4 are attachable to the image forming apparatus 1 according to the present embodiment. However, the numbers of drum cartridges 20 and toner cartridges 4 attached to the image forming apparatus 1 are not limited to the example of FIG. 2. For example, the image forming apparatus 1 may be a monochromatic printer that allows a single drum cartridge 20 and a single toner cartridge 4 to be attached thereto.

Each of the toner cartridges 4 contains toner that is consumed when the image forming apparatus 1 performs printing. That is, each of the toner cartridges 4 is a consumable for the image forming apparatus 1. Further, each of the drum cartridges 20 includes a photosensitive drum 21 that is used when the image forming apparatus 1 performs printing. Each of the drum cartridges 20 is also an example of the consumable for the image forming apparatus 1. Also, each of the drum cartridges 20 is an example of the replacement component for use with the toner cartridges 4.

The main casing 10 has a rectangular box shape, for example. The four drum cartridges 20, the four toner cartridges 4, a transfer belt 70, a controller 61, a main memory 62, a communication part 63, an operation part 64 (the user interface), and a display 65 are accommodated in the main casing 10. Note that, in a case where the operation part 64 is a hardware button, a pressing surface of the operation part 64 may be provided at an outer surface of the main casing 10 so that the user can operate the pressing surface. Further, a display surface of the display 65 may be provided at the outer surface of the main casing 10 so that the user can visually recognize displayed information.

The main casing 10 has four cartridge retaining parts 13. Each of the cartridge retaining parts 13 is formed in a recess and has an opening. The drum cartridges 20 and the toner cartridges 4 are retained in the respective cartridge retaining parts 13 to be attached to the main casing 10.

Cover 11

Light source units 50 are provided corresponding to the drum cartridges 20 at the cover 11 of the image forming apparatus 1. That is, the image forming apparatus 1 includes four light source units 50. The cover 11 is pivotally movable (movable) about a pivot shaft 11A extending in a first direction between an open position indicated by a solid line in FIG. 2 in which the cover 11 opens an opening 10A and a closed position indicated by a two-dotted chain line in FIG. 2 in which the cover 11 closes the opening 10A. The opening 10A provided at an upper end of the main casing 10 is opened and closed in accordance with pivotal movement of the cover 11.

Note that the "first direction" indicates a direction in which a rotation center axis (a developing axis) of a developing roller of a toner cartridge extends. The respective openings of the cartridge retaining parts 13 are opened when the cover 11 is positioned at the open position, and the respective openings of the cartridge retaining parts 13 are covered by the cover 11 when the cover 11 is positioned at the closed position.

A closure sensor 12 is provided at the opening 10A of the main casing 10. The closure sensor 12 is electrically connected to the controller 61. The closure sensor 12 is a sensor detecting that the cover 11 is at the closed position for closing the opening 10A. The controller 61 determines that the cover 11 is at the closed position when a signal detecting that the cover 11 is at the closed position is inputted from the closure sensor 12. On the other hand, the controller 61 determines that the cover 11 is open when a signal detecting that the cover 11 is at the closed position is not inputted from the closure sensor 12. The closure sensor 12 may be a contact-type sensor or an optical-type sensor, for example.

Toner Cartridges 4

Each of the toner cartridges 4 includes a cartridge casing that can accommodate therein a developing roller 41 and developer (for example, toner) as an example of the printing material. The cartridge casing is attachable to the main casing 10. The four toner cartridges 4 accommodate therein developer of colors different from one another (for example, the respective colors of cyan, magenta, yellow, and black) as a material used for performing image formation. The developer is a material consumed during use. The developing roller 41 is a hollow cylindrical member extending in the first direction and is rotatable about its developing axis extending in the first direction. When the toner cartridges 4 are attached to the corresponding drum cartridges 20, outer circumferential surfaces of the photosensitive drums 21 contact outer circumferential surfaces of the corresponding developing rollers 41.

Also, each of the toner cartridges 4 includes a toner memory 42 (the first consumable memory or the second consumable memory), as illustrated in FIG. 3. The toner memory 42 is positioned at an outer surface of the toner cartridge 4 at one side in the first direction. The toner memory 42 is a memory from which information is readable and to which information is writable. For example, the toner memory 42 is a flash ROM (Read Only Memory) or an EEPROM (Electronically Erasable and Programmable Read Only Memory). "EEPROM" is a registered Japanese trademark of Renesas Electronics Corporation.

Each of the toner memories 42 stores therein toner cartridge information 420 which is information related to the toner cartridge 4. The data structure of the toner cartridge information 420 will be described later with reference to FIG. 5.

Drum Cartridges 20

Each of the drum cartridges 20 includes a cartridge casing attachable to the main casing 10. The cartridge casing includes the photosensitive drum 21 as a component used for performing image formation. The drum cartridge 20 is a replacement component that needs to be replaced since deterioration such as wear of the surface of the photosensitive drum 21 occurs during use. The photosensitive drum 21 is a hollow cylindrical photosensitive member extending in the first direction. The photosensitive drum 21 is rotatable about its drum axis extending in the first direction. The outer circumferential surface of the photosensitive drum 21 is coated with a photosensitive material.

Therefore, each of the toner cartridges 4 is an example of the first consumable or the second consumable. Further, each of the drum cartridges 20 is an example of the first consumable or the second consumable. Still further, each of the drum cartridges 20 is also an example of the replacement component.

Each of the drum cartridges 20 may include a drum memory 22 (the first consumable memory or the second consumable memory). The drum memory 22 is a memory from which information is readable and to which information is writable. For example, the drum memory 22 is a flash ROM or an EEPROM.

As illustrated in FIG. 3, each of the drum memories 22 stores therein drum cartridge information 220 which is information related to the drum cartridge 20. The data structure of the drum cartridge information 220 will be described later with reference to FIG. 6.

Attachment of Cartridges and Printing Mechanism

As illustrated in FIG. 2, the drum cartridges 20 and the toner cartridges 4 are attached to the main casing 10 in a state where the cover 11 is positioned at the open position. In this state, the drum cartridges 20 and the toner cartridges 4 are inserted into the corresponding cartridge retaining parts 13 through the opening 10A.

The four light source units 50 are attached to an inner surface of the cover 11. The light source units 50 are disposed so as to face the surfaces of the corresponding photosensitive drums 21 in a state where the drum cartridges 20 are attached to the main casing 10 and the cover 11 is at the closed position. Each of the light source units 50 has a plurality of light sources arranged in the first direction. Each of the light sources can emit light to the outer circumferential surface of the corresponding photosensitive drum 21. Each of the light sources is an LED (Light Emitting Diode), for example.

The light source units 50 are electrically connected to the controller 61. The controller 61 causes the plurality of light sources of the light source units 50 to emit light in accordance with inputted image data. The light sources emit light toward the outer circumferential surfaces of the corresponding photosensitive drums 21. As a result, the photosensitive material on the outer circumferential surfaces of the photosensitive drums 21 is exposed to light in accordance with the image data.

The transfer belt 70 is a component that transfers developer (for example, toner) carried on the surfaces of the photosensitive drums 21 onto printing paper. The transfer belt 70 is a replacement component that needs to be replaced since deterioration such as wear of a surface of the transfer belt 70 occurs during use. The transfer belt 70 is a belt having an annular shape (an endless belt) that can contact the photosensitive drums 21. The outer circumferential surfaces of the photosensitive drums 21 can contact the outer peripheral surface of the transfer belt 70. During a printing process, printing paper is conveyed between the transfer belt 70 and each of the photosensitive drums 21.

The transfer belt 70 is looped over a drive roller 71 and a follower roller 72. The drive roller 71 drives the transfer belt 70. The controller 61 causes the drive roller 71 to rotate. The follower roller 72 rotates following movement of the transfer belt 70 in accordance with driving of the drive roller 71.

Internal Structure of Main Casing

The controller 61 includes an ASIC (Application Specific Integrated Circuit), for example. The controller 61 is electrically connected to the main memory 62 and the communication part 63, which are provided in the main casing 10 of the image forming apparatus 1. Although not illustrated in FIG. 3, the operation part 64 and the display 65 are also electrically connected to the controller 61. The controller 61 executes various operations to cause the image forming apparatus 1 to execute various processes related to printing.

Note that the controller 61 may include a processor such as a CPU (Central Processing Unit). In this case, a control program for implementing a method of controlling the image forming apparatus 1 may be stored in the main memory 62, and the controller 61 may cause the image forming apparatus 1 to execute various processes by the processor operating according to the control program.

The controller 61 may include a computer-readable storage medium that stores therein the control program such as the main memory 62. A "non-transitory tangible medium" such as a ROM, a tape, a disc, a card, a semiconductor memory, or a programmable logic circuit can be used as the storage medium. Further, a RAM (Random Access Memory) or the like for developing the control program may be employed. The control program may be supplied to the computer via any transmission medium (a communication network, broadcast waves, etc.) capable of transmitting the control program. Note that, according to one aspect of the present disclosure, the control program can be implemented in the form of data signals embedded in a carrier wave embodied in electronic transmission.

As illustrated in FIG. 3, the image forming apparatus 1 includes connectors 101, and connectors 102. As the connectors 101 are electrically connected to the corresponding drum memories 22 in a state where the drum cartridges 20 are inserted in the corresponding cartridge retaining parts 13 illustrated in FIG. 2, the controller 61 can communicate with the drum memories 22 of the drum cartridges 20. That is, the controller 61 can execute a process to read information from each of the drum memories 22 and a process to write (including a process to rewrite) information to each of the drum memories 22.

Further, as the connectors 102 are electrically connected to the corresponding toner memories 42 in a state where the toner cartridges 4 are attached to the main casing 10, the controller 61 can communicate with the toner memories 42 of the toner cartridges 4. That is, the controller 61 can execute a process to read information from each of the toner memories 42 and a process to write (including a process to write) information to each of the toner memories 42.

The main memory 62 is a memory from which information is readable and to which information is writable. For example, the main memory 62 is a flash ROM or an EEPROM. The main memory 62 has one or more storage areas. In one example, various information described below is stored in the respective areas.

Cartridge information 621 is information related to cartridges attached to the image forming apparatus 1. Specifically, the cartridge information 621 includes the toner cartridge information 420 read from the toner memories 42 of the toner cartridges 4 of respective colors in such a manner that the toner cartridge information 420 can be identified for each of the toner cartridges 4. The cartridge information 621 also includes the drum cartridge information 220 read from the drum memories 22 of the drum cartridges 20 in such a manner that the drum cartridge information 220 can be identified for each of the drum cartridges 20.

The toner cartridge information 420 includes, for example, first lifetime information related to a service life of the toner cartridge 4. The drum cartridge information 220 includes, for example, second lifetime information related to a service life of the drum cartridge 20. The details of the data structures of the toner cartridge information 420 and the drum cartridge information 220 which are stored as the cartridge information 621 will be described later with reference to FIGS. 5 and 6.

In the present embodiment, the cartridge information (the drum cartridge information 220 and the toner cartridge information 420) read from the memory of each of the cartridges is referred to so that the controller 61 can accurately determine a state of the cartridges. By accurately grasping the state of the cartridges, the controller 61 can properly initialize the cartridge information in order for the cartridges to be properly recycled.

In the following description, "recycling the cartridge" denotes that the cartridge is restored to a state suitable for printing by performing replacement or replenishment only for a component that needs to be replaced among the constituent elements of the cartridge. That is, recycling of the cartridge includes not only replenishment of a consumed material, but also replacement of a deteriorated component with a new one. Hereinafter, a cartridge (a consumable) recycled by replenishment of a material or replacement of a component will be referred to as "recycled cartridge (a recycled product)".

A device ID 622 is identification information for identifying the image forming apparatus 1. The device ID 622 is a serial number of the image forming apparatus 1, for example.

Mode information 623 is information indicating an operation mode of the image forming apparatus 1. For example, in the present embodiment, two modes of "subscription mode" and "non-subscription mode" are defined. The "subscription mode" indicates that the image forming apparatus 1 operates on the image formation system 100 as a contracted machine for which an agreement is reached. The "non-subscription mode" indicates that the image forming apparatus 1 is not a contracted machine and operates as a normal image forming apparatus for which an agreement is not reached.

At the time of shipment of the image forming apparatus 1, the mode information 623 representing a value corresponding to the non-subscription mode is stored by default in the main memory 62. The server 8 transmits, to the image forming apparatus 1 of the user who reached an agreement, a request including an agreement shift instruction instructing the image forming apparatus 1 to shift to the subscription mode. In response to the request from the server 8, the controller 61 changes the mode information 623 from the non-subscription mode to the subscription mode. In one example, in the present embodiment, such an operation that the controller 61 changes the value of the mode information 623 from the non-subscription mode to the subscription mode in this way will be referred to as "shift to the subscription mode".

Usage history information 624 is information indicating a history of using the recycled cartridge in the image forming apparatus 1. In one example, the usage history information 624 may be information indicating the number of recycled cartridges that have been attached to the image forming apparatus 1. In another example, the usage history information 624 may be a table retaining a combination of a cartridge ID of the recycled cartridge and a recycle number. In still another example, the usage history information 624 may be a flag indicating whether a recycled cartridge has been attached even once or has never been attached.

Figures 4, 5:
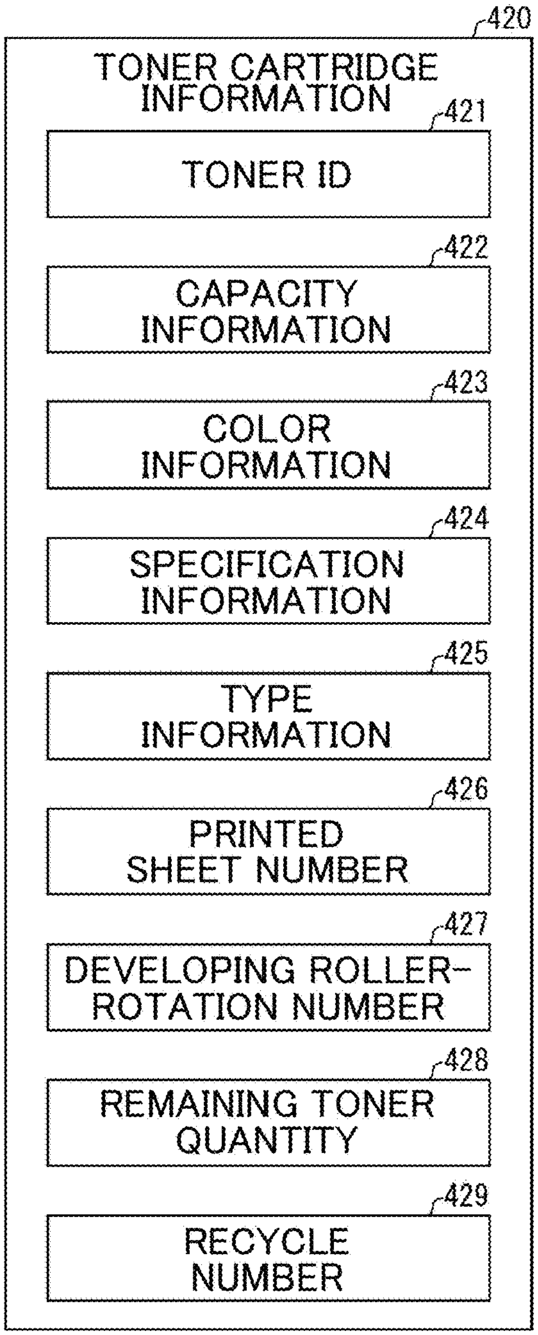
FIG. 4 is a diagram illustrating one example of a data structure of usage history information stored in a main memory.
FIG. 5 is a diagram illustrating one example of a data structure of toner cartridge information stored in a toner memory.

FIG. 4 is a diagram illustrating one example of the data structure of the usage history information 624 in the form of the table described above. The cartridge ID is identification information for uniquely identifying the recycled cartridge that has been attached to the image forming apparatus 1. The recycle number is information indicating the number of times the attached recycled cartridge has been recycled at a point of time the recycled cartridge is attached.

When the recycled cartridge attached to the image forming apparatus 1 is a toner cartridge 4, for example, the controller 61 reads a toner ID 421 described later (see FIG. 5) stored in the toner memory 42 and stores the toner ID 421 in the usage history information 624 as the cartridge ID. For example, the controller 61 stores "TON0001" in the usage history information 624 as the toner ID 421. "TON" represents a toner cartridge 4, and "0001" is a serial number unique to the toner cartridge 4. The controller 61 also reads a recycle number 429 described later (see FIG. 5) stored in the toner memory 42, and stores the recycle number 429 in the usage history information 624 as the recycle number.

When the recycled cartridge attached to the image forming apparatus 1 is a drum cartridge 20, for example, the controller 61 reads a drum ID 221 described later (see FIG. 6) stored in the drum memory 22, and stores the drum ID 221 in the usage history information 624 as the cartridge ID. For example, the controller 61 stores "DRM0056" in the usage history information 624 as the drum ID 221. "DRM" represents a drum cartridge 20, and "0056" is a serial number unique to the drum cartridge 20. The controller 61 also reads a recycle number 226 described later (see FIG. 6) stored in the drum memory 22, and stores the recycle number 226 in the usage history information 624 as the recycle number.

The controller 61 counts the number of recycled cartridges that have been attached to the image forming apparatus 1 by referring to the usage history information 624 illustrated in FIG. 4. At this time, the controller 61 can count the number of recycled cartridges while distinguishing not only the cartridge ID but also the recycle number. That is, for one cartridge having the identical cartridge ID, the controller 61 can perform counting while distinguishing the attachment in which the recycle number is the first from the attachment in which the recycle number is the second.

Upper limit information 625 is information representing an upper limit of the number of times of recycling allowed for each cartridge. In the present embodiment, recycling of the cartridge in excess of the upper limit of the number of times of recycling included in the upper limit information 625 is prohibited. For example, the controller 61 compares the recycle number of the cartridge with the upper limit information 625. As to the cartridge whose recycle number reaches the upper limit of the number of times of recycling, the controller 61 can perform controlling so as not to perform initialization of the cartridge information for recycling. Hence, the upper limit information 625 includes the upper limit of the number of times of recycling for each of the toner cartridge 4 and the drum cartridge 20.

A first sheet number counter 626 is the cumulative number of printed sheets in the image forming apparatus 1. A second sheet number counter 627 is the number of sheets printed in the image forming apparatus 1 using the subscription service. The second sheet number counter 627 may be reset to 0 each time the image forming apparatus 1 shifts from the non-subscription mode to the subscription mode, or may be the cumulative number of sheets printed in the image forming apparatus 1 using the subscription service to date. Hereinafter, unless otherwise specified, the second sheet number counter 627 is assumed to be the cumulative number of sheets printed as the subscription printing.

Specification information 628 is information representing a specification of the image forming apparatus 1. For example, in the present embodiment, the image forming apparatus 1 and the consumables therefor are manufactured with specifications adapted to the circumstances of countries where they are used. For example, there are three specifications of "for EU (Europe)", "for US (United States)", and "for JP (Japan)" for the image forming apparatus 1 and the consumables therefor. The specification information 628 indicates one of the specifications described above.

In addition to the information described above, the main memory 62 may have an area for storing the cumulative number of printed sheets in the image forming apparatus 1, an area for storing a state of an error occurring in the image forming apparatus 1, and the like.

The communication part 63 conducts communications between the image forming apparatus 1 and the server 8 over a communication network such as the Internet. The communication part 63 outputs a request received from the server 8 to the controller 61. For example, the "request" indicates various requests, instructions, inquiries, and the like transmitted from the server 8 in a process executed related to an agreement. The communication part 63 returns a result calculated and outputted by the controller 61 in response to the above request to the server 8 as a "response".

In the present embodiment, return of the "response" by the communication part 63 may be omitted. For example, when the request is an instruction instructing to change various settings in the image forming apparatus 1, the controller 61 changes the various settings in the image forming apparatus 1 according to the instruction. However, a notification notifying that the settings have been changed need not be returned to the server 8 via the communication part 63.

Structure of Server

The server 8 includes a server communication part 83, a server memory 82, and a server controller 81 (a controller). The server communication part 83 is a communication interface that conducts communications between the server 8 and the image forming apparatus 1. The server communication part 83 transmits a request inputted from the server controller 81 to the image forming apparatus 1. The server communication part 83 receives a response transmitted from the image forming apparatus 1 in response to the transmitted request, and outputs the response to the server controller 81.

The server communication part 83 communicates with the user terminal 9 operated by the user of the image forming apparatus 1 over a communication network, and transmits and receives information to and from the user terminal 9. In the present embodiment, the server communication part 83 transmits and receives various information required for reaching an agreement to and from the user terminal 9.

The server memory 82 is a storage device that stores therein data required for an operation of the server 8. The server memory 82 stores therein device information 821 for each image forming apparatus 1 under the subscription service provided in the image formation system 100. The device information 821 may include, for example, the device ID 622, a subscription flag, a subscription upper limit number of sheets, the model number of the image forming apparatus 1, the date of manufacture of the image forming apparatus 1, and the like.

The device ID 622 is identification information for the server 8 to uniquely identify the image forming apparatus 1. The subscription flag is information representing whether or not the image forming apparatus 1 shifted to the subscription mode, i.e., whether or not the image forming apparatus 1 is already recognized as the contracted machine. The subscription upper limit number of sheets indicates the upper limit of the number of sheets for which the image forming apparatus 1 can perform the subscription printing within a prescribed period of time determined in the agreement.

The server controller 81 is a CPU that performs overall control of the server 8. The server controller 81 generates a request for the image forming apparatus 1 at a prescribed timing, and outputs the generated request to the server communication part 83.

Further, on the basis of a response received from the image forming apparatus 1 via the server communication part 83, the server controller 81 newly stores the device information 821 in the server memory 82, and updates the device information 821 that is already stored in the server memory 82.

Data Structure of Cartridge Information

Toner Cartridge Information

FIG. 5 is a diagram illustrating one example of the data structure of the toner cartridge information 420 stored in the toner memory 42. The toner cartridge information 420 includes, for example, the toner ID 421, capacity information 422, color information 423, specification information 424, type information 425 (the first type information), first lifetime information, and first initialization information.

The first lifetime information is information related to a service life of a consumables. For example, the first lifetime information includes at least one of: first consumption information for identifying the degree to which the consumable is used; and first remaining quantity information for identifying a quantity of a material remaining in the consumable. Although not limited thereto, a printed sheet number, a dot count, a printing material consumption quantity, a developing roller-rotation number, a drum-rotation number, and the like are examples of the first consumption information, for example. Although not limited thereto, a remaining quantity of a printing material such as a remaining toner quantity, a remaining ink quantity, and the like are examples of the first remaining quantity information, for example.

The toner cartridge information 420 of the toner cartridge 4 includes, as examples of the first lifetime information, a printed sheet number 426, a developing roller-rotation number 427, a remaining toner quantity 428 (the remaining printing material quantity), and the like. Alternatively, a dot count may be included as the first lifetime information. The first initialization information is information indicating whether or not at least a part of the information stored in the consumable memory was initialized according to the user's instruction, and is the recycle number 429, for example. The recycle number 429 indicates the number of times that the toner memory 42 was initialized for recycling.

The various information mentioned above are merely examples of the toner cartridge information 420. Any other information may be added, or a part of the various information described above may be appropriately omitted depending on the environment or the circumstance in which the image formation system 100 is constructed.

The toner ID 421 is identification information (the first identification information) for uniquely identifying the toner cartridge 4. For example, the toner ID 421 may be configured of "TON" representing a toner cartridge 4, and a serial number unique to the toner cartridge 4 (see FIG. 4).

The capacity information 422 is information representing a capacity of the toner cartridge 4 for accommodating the printing material. For example, in the present embodiment, the capacity of the toner cartridge 4 can be set from four levels. More specifically, there are four levels of "small capacity", "standard capacity", "large capacity", and "extra-large capacity" in the ascending order as the capacity that can be set for the toner cartridge 4. The capacity information 422 represents one of the capacities described above.

The color information 423 is information representing the color of the printing material accommodated in the toner cartridge 4. In the present embodiment, there are four colors of "C (cyan)", "M (magenta)", "Y (yellow)", and "BK (black)" for the toner cartridge 4, for example. The color information 423 represents one of the colors described above.

The specification information 424 is information representing a specification of the toner cartridge 4. Similar to the main body of the image forming apparatus 1, there are three specifications of "for EU (Europe)", "for US (United States) ", and "for JP (Japan)" for the toner cartridge 4. The specification information 424 represents one of the specifications described above.

The type information 425 (the first type information) is information representing a type of the toner cartridge 4. In the present embodiment, at least two types of "subscription" and "commercial" can be set as the type of the toner cartridge 4. The type information 425 represents one of the types described above.

The toner memory 42 of the subscription cartridge stores therein the type information 425 representing the type "subscription". The image forming apparatus 1 can perform the subscription printing while the subscription cartridge is attached thereto. For example, the subscription cartridge is supplied from the company to the user who reached an agreement for the image forming apparatus 1.

The toner memory 42 of the commercial toner cartridge 4 that can be purchased from electronics retail stores or online shopping websites stores therein the type information 425 representing the type "commercial". Hereinafter, the toner cartridge 4 of this type will be referred to as "commercial cartridge (the normal consumable)" for the purpose of distinguishing the commercial cartridge from the subscription cartridge (the subscription consumable). The commercial cartridge may be a so-called genuine product manufactured by a manufacturer of the image forming apparatus 1, or a so-called third-party product manufactured by a third party other than the manufacturer of the image forming apparatus 1.

The printed sheet number 426 (the first lifetime information, the first consumption information) is information representing the number of sheets printed in the image forming apparatus 1 since the toner cartridge 4 is attached to the image forming apparatus 1.

The developing roller-rotation number 427 (the first lifetime information, the first consumption information) is information representing the number of rotations of the developing roller 41 occurred in the toner cartridge 4 in association with execution of printing since the toner cartridge 4 is attached to the image forming apparatus 1.

The remaining toner quantity 428 (the first lifetime information, the first remaining quantity information) is information representing the quantity of toner remaining in the toner cartridge 4. In one example, the remaining toner quantity 428 may be configured of a value corresponding to a plurality of levels from full to empty. For example, the remaining toner quantity 428 may be represented by a character string such as "FULL" to "EMPTY", may be a numerical value such as "100%" to "0%", or may be information combining a character string and a numerical value.

An initial value of the remaining toner quantity 428 corresponds to the full quantity of the capacity set in the capacity information 422. For example, as the toner is consumed during use, a sensor (not illustrated) may optically measure the toner cartridge 4. The controller 61 may write the remaining quantity of toner obtained by the above measurement in the toner memory 42 as the remaining toner quantity 428.

In another example, the controller 61 may monitor a consumption toner quantity which is a quantity of toner ejected from the toner cartridge 4 and consumed, and may calculate the remaining quantity of toner on the basis of the capacity information 422 stored in the toner memory 42 and the monitored consumption toner quantity. The controller 61 may write the calculated remaining quantity of toner in the toner memory 42 as the remaining toner quantity 428.

The recycle number 429 (the first initialization information) is information representing the number of times that at least a part of the information stored in the toner memory 42 of the toner cartridge 4 was initialized in accordance with the user's instruction (the initialization number). In the present embodiment, initialization of information in the toner memory 42 based on the user's instruction is performed once for each recycling.

Therefore, "the number of times that the information was initialized" described above for the toner memory 42 denotes the number of times that the toner cartridge 4 was recycled. In a case where the recycle number 429 represents a value less than 1, the recycle number 429 denotes that the toner cartridge 4 has never been recycled. In a case where the recycle number 429 represents a value equal to or more than 1, the recycle number 429 denotes that the toner cartridge 4 is a recycled cartridge.

Drum Cartridge Information

Figure 6:
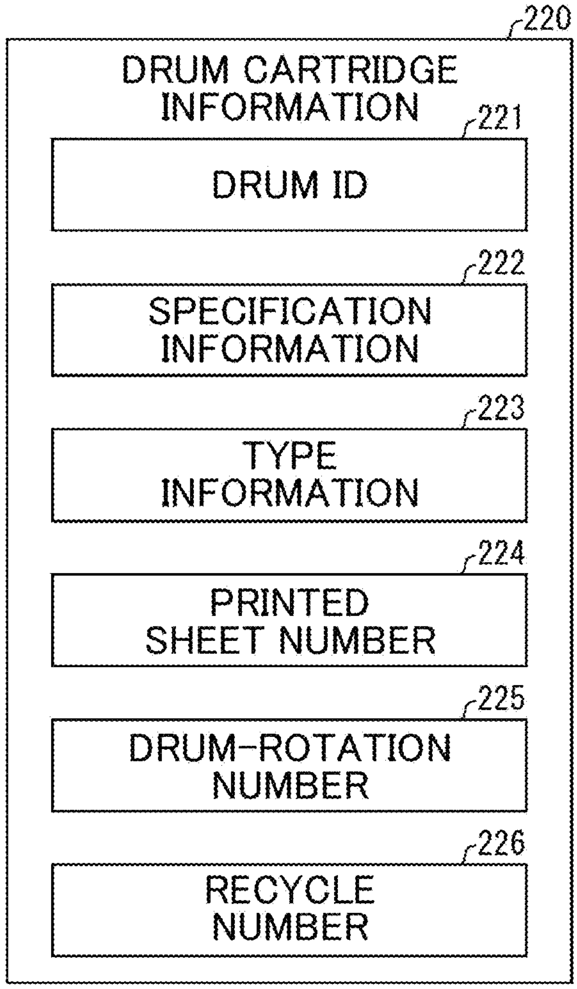
FIG. 6 is a diagram illustrating one example of a data structure of drum cartridge information stored in a drum memory.

FIG. 6 is a diagram illustrating one example of the data structure of the drum cartridge information 220 stored in the drum memory 22. The drum cartridge information 220 includes, for example, the drum ID 221, specification information 222, type information 223 (the second type information), second lifetime information, and second initialization information.

The drum cartridge information 220 of the drum cartridge 20 includes, as examples of the second lifetime information, a printed sheet number 224, a drum-rotation number 225, and the like. Similar to the toner cartridge 4, the second initialization information is, for example, the recycle number 226.

The various information described above are merely examples of the drum cartridge information 220. Any other information may be added, or a part of the various information described above may be appropriately omitted depending on the environments or the circumstance in which the image formation system 100 is constructed.

The drum ID 221 is identification information (the second identification information) for uniquely identifying the drum cartridge 20. For example, the drum ID 221 is configured of "DRM" representing a drum cartridge 20, and a serial number unique to the drum cartridge 20 (see FIG. 4).

The specification information 222 is information representing a specification of the drum cartridge 20. Similar to the image forming apparatus 1 and the toner cartridge 4, there are three specifications of "for EU (Europe)", "for US (United States)", and "for JP (Japan)" for the drum cartridge 20. The specification information 222 represents one of the specifications described above.

The type information 223 (the second type information) is information representing a type of the drum cartridge 20.

Similar to the toner cartridge 4, at least two types of "subscription" and "commercial" can be set as the type of the drum cartridge 20. The type information 223 represents one of the types described above.

The printed sheet number 224 (the second lifetime information, the second consumption information) is information representing the number of sheets printed in the image forming apparatus 1 since the drum cartridge 20 is attached to the image forming apparatus 1.

The drum-rotation number 225 (the second lifetime information, the second consumption information) is information representing the number of rotations of the photosensitive drum 21 occurred in the drum cartridge 20 in association with execution of printing since the drum cartridge 20 is attached to the image forming apparatus 1.

The recycle number 226 (the second initialization information) is information representing the number of times that at least a part of the information stored in the drum memory 22 of the drum cartridge 20 was initialized in accordance with the user's instruction (the initialization number). Initialization of the information in the drum memory 22 based on the user's instruction is performed once for each recycling. Therefore, "the number of times that the information was initialized" described above for the drum memory 22 denotes that the number of times that the drum cartridge 20 was recycled. In a case where the recycle number 226 represents a value less than 1, the recycle number 226 denotes that the drum cartridge 20 has never been recycled. In a case where the recycle number 226 indicates a value equal to or more than 1, the recycle number 226 denotes that the drum cartridge 20 is a recycled cartridge.

Hereinafter, flow of processes executed by the controller 61 of the image forming apparatus 1 during a recycle preparation phase will be described with reference to FIGS. 7 to 13. In the recycle preparation phase, the controller 61 executes various processes required to initialize the cartridge information stored in each of the consumable memories of a plurality of consumables selected through the user instructions.

Process Flow of Recycle Preparation Phase

Figure 7:
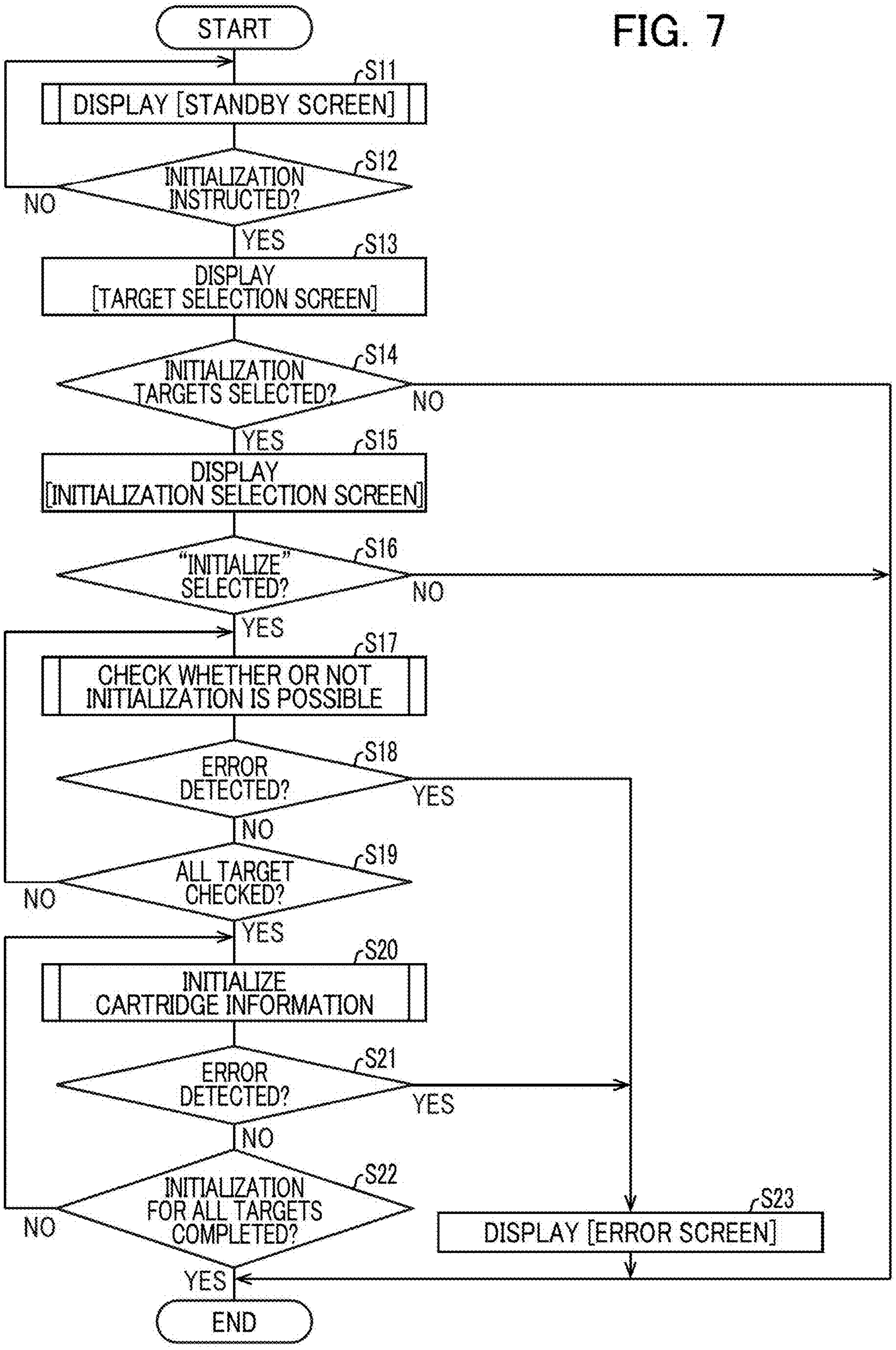
FIG. 7 is a flowchart illustrating process flow executed by the image forming apparatus in a recycle preparation phase.

FIG. 7 is a flowchart illustrating process flow executed by the image forming apparatus 1 in the recycle preparation phase. The series of processes illustrated in FIG. 7 is executed by the controller 61. The controller 61 causes the display 65 to display thereon a standby screen and a target selection screen.

In S11 as illustrated in FIG. 7, the controller 61 causes the display 65 to display thereon a standby screen. The standby screen is, for example, a screen displayed while the image forming apparatus 1 is in a printing standby state. The standby screen may be displayed when a power switch of the image forming apparatus 1 is turned on, or when the image forming apparatus 1 returns from a sleep state, for example. The standby screen includes a user interface component (hereinafter referred to as "UI component") for causing the image forming apparatus 1 to execute various operations.

The UI component may be constituted by a software button that the user can select by operating the operation part 64. In one example, the standby screen includes a first UI component for instructing to initialize the desired cartridge information among the toner cartridge information 420 stored in the toner memory 42 and the drum cartridge information 220 stored in the drum memory 22. Note that the detailed process flow in S11 will be described later in detail with reference to another drawing.

In S12 (the reception process, the reception step), the controller 61 detects that initialization of the desired cartridge information among the toner cartridge information 420 and the drum cartridge information 220 is instructed by the user. For example, the controller 61 may detect that the operation part 64 which is a hardware button indicating "determine" is pressed in a state where the first UI component in the standby screen is selected. Alternatively, the controller 61 may detect that a touch operation is performed on the first UI component through the operation part 64 formed integrally with the display 65 as a touch panel. When detecting that the controller 61 receives an instruction instructing to initialize the desired cartridge information from the user as described above, the controller 61 advances the process from YES in S12 to S13.

Although not illustrated in the drawings, when another UI component that instructs to perform another operation is selected in the standby screen, the controller 61 advances the process from NO in S12 to a step in which an operation according to the instruction is executed. For example, when the user operates a settings button to modify settings in the image forming apparatus 1, the controller 61 may proceed to a process for causing the display 65 to display thereon a settings screen. When the user selects a prescribed paper feed tray (such as a manual feed tray) from print settings displayed on the display 65 and then operates a button to execute printing, the controller 61 may advance the process to execute the specified printing.

In S13 (the first display process, the first display step), the controller 61 causes the display 65 to display thereon a target selection screen. The target selection screen includes a display that prompts the user to select toner cartridges 4 and drum cartridges 20 to be initialized.

Figure 13:
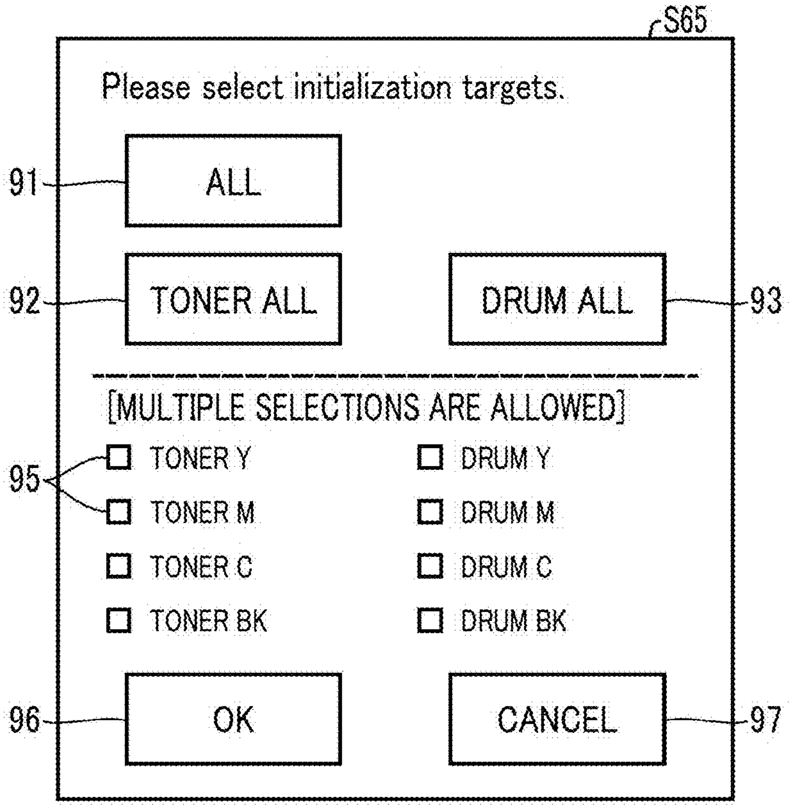
FIG. 13 is a diagram illustrating one example of a target selection screen for selecting initialization targets.

Here, one example of the target selection screen will be described with reference to FIG. 13. FIG. 13 illustrates one example of the target selection screen for selecting initialization targets. In this drawing, the operation part 64 is configured of a touch panel integrally provided over the screen of the display 65.

As illustrated in FIG. 13, the controller 61 displays "Please select initialization targets." on the top of the screen, thereby prompting the user to select the toner cartridges 4 and the drum cartridges 20 to be initialized. The controller 61 may also display an "ALL" button 91 in the top of the screen for selecting all of the toner cartridges 4 for the four colors and the drum cartridges 20 for the four colors as the initialization targets.

The controller 61 may also display a "TONER ALL" button 92 below the "ALL" button 91 for selecting all of the toner cartridges 4 for the four colors as the targets of initialization. The controller 61 may also display a "DRUM ALL" button 93 to the right of the "TONER ALL" button 92 for selecting all of the drum cartridges 20 for the four colors as the targets of initialization.

The controller 61 may also display checkboxes 95 below the center of the display 65 for selecting each of the toner cartridges 4 and the drum cartridges 20 of "C (cyan)", "M (magenta)", "Y (yellow)", and "BK (black)" individually in any combination. As illustrated in FIG. 13, the checkboxes 95 may be configured to allow multiple selections.

The controller 61 may also display an "OK" button 96 below the checkboxes 95 for inputting an instruction instructing the controller 61 to accept the selected initialization targets. The controller 61 may also display a "CANCEL" button 97 to the right of the "OK" button 96 for inputting an instruction instructing the controller 61 to cancel the selections of initialization targets. The arrangement of the "ALL" button 91, the "TONER ALL" button 92, the "DRUM ALL" button 93, the checkboxes 95, the "OK" button 96, and the "CANCEL" button 97 is not limited to the above example.

Next, in S14 the controller 61 detects whether initialization targets have been selected through the target selection screen indicating the toner cartridges 4 and the drum cartridges 20 to be initialized. For example, when the checkbox 95 for "TONER Y" and the checkbox 95 for "TONER M" have been checked in the target selection screen, the controller 61 detects that the checkbox 95 for "TONER Y" and the checkbox 95 for "TONER M" have been pressed. When the controller 61 then detects that the "OK" button 96 has been pressed, the controller 61 detects that the yellow toner cartridge 4 (the first consumable) and the magenta toner cartridge 4 (the second consumable) have been selected as the initialization targets.

As another example, when the checkbox 95 for "TONER Y" and the checkbox 95 for "DRUM Y" have been checked in the target selection screen, the controller 61 detects that the checkbox 95 for "TONER Y" and the checkbox 95 for "DRUM Y" have been pressed. When the controller 61 then detects that the "OK" button 96 has been pressed, the controller 61 detects that the yellow toner cartridge 4 (the first consumable) and the yellow drum cartridge 20 (the second consumable) have been selected as the initialization targets.

As another example, when the "ALL" button 91 has been pressed in the target selection screen, the controller 61 detects that the "ALL" button 91 has been pressed. When the controller 61 then detects that the "OK" button 96 has been pressed, the controller 61 detects that all of the toner cartridges 4 for the four colors and all of the drum cartridges 20 for the four colors have been selected as the initialization targets.

When detecting that the initialization targets to be initialized have been selected as described above, the controller 61 stores the toner cartridges 4 and the drum cartridges 20 selected as the initialization targets in the main memory 62 in a predetermined order. For example, when one of the "ALL" button 91, the "TONER ALL" button 92, and the "DRUM ALL" button 93 has been pressed in the target selection screen, the controller 61 stores the toner cartridges 4 in a predetermined color order. Subsequently, the controller 61 stores the drum cartridges 20 in the main memory 62 in a predetermined color order.

As another example, when the multiple checkboxes 95 have been checked in the target selection screen, the controller 61 stores the corresponding toner cartridges 4 and drum cartridges 20 in the main memory 62 in the order in which the checkboxes 95 have been checked. However, the order of storage in the main memory 62 when the multiple checkboxes 95 have been checked in the target selection screen is not limited to this order. Thereafter, the controller 61 advances the process from YES in S14 to S15.

On the other hand, when the controller 61 detects that the "CANCEL" button 97 has been pressed, the controller 61 determines that the selections of the initialization targets have been canceled, and advances the process from NO in S14, thereby ending the series of processes. The controller 61 may return to S11 from NO in S14 to cause the display 65 to display thereon the standby screen.

In S15 (the second display process, the second display step), the controller 61 causes the display 65 to display thereon an initialization selection screen (the first selection screen). The initialization selection screen includes a first warning for informing the user that the print quality is not warranted when the first life information in the toner cartridge information 420 and the second life information in the drum cartridge information 220 are initialized.

The initialization selection screen also includes a second UI component for the user to select whether to initialize each of the first life information in the toner cartridge information 420 and the second life information in the drum cartridge information 220 or not. As an example, the second UI component is configured of an "Initialize" button and a "Do not initialize" button and allows the user to select one of the buttons.

The "Initialize" button denotes that the user wishes to initialize the first life information and the second life information. The "Do not initialize" button denotes that the user does not wish to initialize the first life information and the second life information. The selection operation by the user may be implemented through a hardware button or a software button.

In S16 the controller 61 determines which of the "Initialize" button and the "Do not initialize" button has been selected in the second UI component. When the controller 61 determines that the "Initialize" button has been selected, the controller 61 advances the process from YES in S16 to S17. On the other hand, when the controller 61 determines that the "Do not initialize" button has been selected, the controller 61 advances the process from NO in S16 to end the series of processes. The controller 61 may also return to S11 from NO in S16 to cause the display 65 to display thereon the standby screen.

The selection of the "Initialize" button by the user denotes that the user agrees with the content of the first warning but still wishes to initialize the toner cartridge information 420 and the drum cartridge information 220 for recycling. In the present embodiment, as the user agrees with the first warning, initialization of the toner cartridge information 420 and the drum cartridge information 220 is permitted.

In S17 the controller 61 checks whether initialization is possible for the toner cartridge 4 or the drum cartridge 20 stored first in the main memory 62 as the initialization target in S14.

Specifically, when a toner cartridge 4 has been stored first, the controller 61 communicates with the first toner cartridge 4. Then, the controller 61 reads the latest toner cartridge information 420 at this point, and checks whether or not the toner cartridge 4 satisfies requirements for recycling. Initialization of the toner cartridge information 420 is permitted when the toner cartridge 4 satisfies the requirements for recycling.

When a drum cartridge 20 has been stored first, the controller 61 communicates with the first drum cartridge 20. The controller 61 then reads the latest drum cartridge information 220 at this point, and checks whether or not the drum cartridge 20 satisfies the requirements for recycling. When the drum cartridge 20 satisfies the requirements for recycling, initialization of the drum cartridge information 220 is permitted. The detailed process flow in S17 will be described later in detail with reference to another drawing.

In S18 the controller 61 determines whether or not an error was detected during the check in S17 described above. When an error was not detected, the controller 61 determines that the toner cartridge information 420 or the drum cartridge information 220 can be initialized, and advances the process from NO in S18 to S19. However, when an error was detected, the controller 61 determines that the toner cartridge information 420 or the drum cartridge information 220 cannot be initialized, and advances the process from YES in S18 to S23.

In S19 the controller 61 determines whether all of the toner cartridges 4 and the drum cartridges 20 that have been stored in the main memory 62 as the initialization targets in S14 have been checked to determine whether or not their cartridge information can be initialized. The cartridge information is either the toner cartridge information 420 or the drum cartridge information 220. When the controller 61 determines that the check has not been completed for all of the toner cartridges 4 and the drum cartridges 20 selected as the initialization targets (S19: NO), the controller 61 selects the next toner cartridge 4 or the drum cartridge 20 in order, and advances to the process of S17.

On the other hand, when the controller 61 determines that the process to check whether or not the cartridge information can be initialized has been completed for all of the toner cartridges 4 and the drum cartridges 20 selected as the initialization targets, the controller 61 advances the process from YES in S19 to S20.

In S20 (the initialization process, the initialization step), the controller 61 initializes the cartridge information in the toner cartridge 4 or the drum cartridge 20 that was stored first in the main memory 62 as the initialization target in S14.

Specifically, when a toner cartridge 4 has been stored first, the controller 61 initializes the toner cartridge information 420 stored in the toner memory 42 of the first toner cartridge 4. Alternatively, when a drum cartridge 20 has been stored first, the controller 61 initializes the drum cartridge information 220 stored in the drum memory 22 of the first drum cartridge 20. The detailed process flow in S20 will be described later in detail with reference to another drawing.

In S21 the controller 61 determines whether or not an error was detected during the initialization in S20 described above. When an error was not detected, the controller 61 determines that the initialization of the toner cartridge information 420 or the drum cartridge information 220 was successful, and advances the process from NO in S21 to S22. However, when an error was detected, the controller 61 determines that the initialization of the toner cartridge information 420 or the drum cartridge information 220 failed, and advances the process from YES in S21 to S23.

In S22 the controller 61 determines whether the initialization has been completed for all of the toner cartridges 4 and the drum cartridges 20 stored in the main memory 62 as the initialization targets in S14. When the controller 61 determines that the initialization has not been completed for all of the toner cartridges 4 and the drum cartridges 20 stored as the initialization targets (S22: NO), the controller 61 selects the next toner cartridge 4 or the drum cartridge 20 in order and subsequently proceeds to the process of S20.

On the other hand, when the controller 61 determines that the initialization has been completed for all of the toner cartridges 4 and the drum cartridges 20 stored in the main memory 62 as the initialization targets in S14, the controller 61 advances the process from YES in S22 to end the series of processes. After the initialization was successful, the controller 61 may cause the display 65 to display thereon an initialization successful screen to notify the user that the initialization was successful.

In S23 the controller 61 causes the display 65 to display thereon an error screen to notify the user that the toner cartridge information 420 and the drum cartridge information 220 have not been initialized. The controller 61 may display different content in a first error screen displayed in response to determining YES in S18 and a second error screen displayed in response to determining YES in S21.

For example, the first error screen may include a message indicating that the initialization cannot be performed because the requirements for recycling the toner cartridge 4 or the drum cartridge 20 have not been met. The second error screen may include a message indicating that the write operation to the toner memory 42 or the drum memory 22 was not completed normally, for example. The second error screen may also include a message prompting the user to check the attached state of the toner cartridge 4 or the drum cartridge 20.

Additionally, for example, the second error screen may include the reason that the write operation to the toner memory 42 or the drum memory 22 was not completed normally, such as the message "The cover is closed." or "Problem communicating with the yellow toner cartridge."

Process to Display Standby Screen

Figure 8:
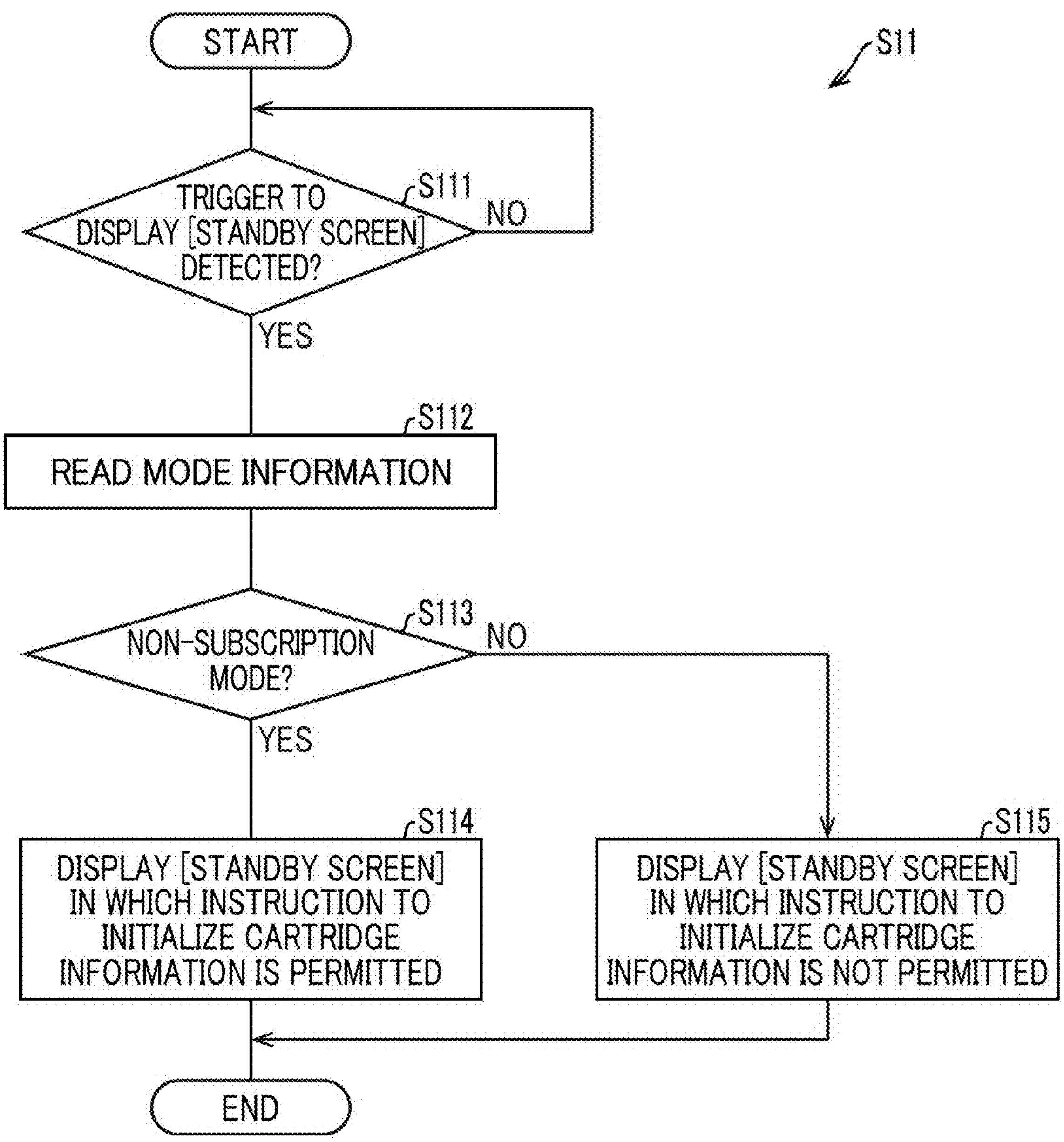
FIG. 8 is a flowchart illustrating process flow to display a standby screen in FIG. 7.

FIG. 8 is a flowchart illustrating process flow to display the standby screen that corresponds to S11 illustrated in FIG. 7.

In S111, the controller 61 detects an event that serves as a trigger of the process to display the standby screen, such as turning on of the power switch. When detecting the trigger, the controller 61 advances the process from YES in S111 to S112.

In S112, the controller 61 reads the mode information 623 stored in the main memory 62. The mode information 623 is information indicating whether the image forming apparatus 1 is in the subscription mode or the non-subscription mode. That is, whether or not the image forming apparatus 1 is the contracted machine is identified by the mode information 623.

In S113, the controller 61 determines whether the mode information 623 indicates the subscription mode or the non-subscription mode. When the mode information 623 indicates the non-subscription mode, that is, when the image forming apparatus 1 is not a contracted machine, the controller 61 advances the process from YES in S113 to S114. When the mode information 623 indicates the subscription mode, that is, when the image forming apparatus 1 is the contracted machine, the controller 61 advances the process from NO in S113 to S115.

In S114, the controller 61 causes the display 65 to display thereon the standby screen so that the cartridge information can be initialized using the image forming apparatus 1 which is not a contracted machine. More specifically, the controller 61 causes the display 65 to display thereon a standby screen that includes a menu button for issuing an instruction instructing to initialize the cartridge information. For example, the controller 61 causes the display 65 to display thereon a standby screen permitting the user to select the first UI component for instructing to initialize desired cartridge information from among the toner cartridge information 420 and the drum cartridge information 220.

In S115, the controller 61 causes the display 65 to display thereon the standby screen so that the cartridge information cannot be initialized using the image forming apparatus 1 which is the contracted machine. Specifically, the controller 61 causes the display 65 to display thereon a standby screen in which a menu button for instructing the initialization of the cartridge information is not displayed or the menu button is displayed but the selection of the menu button is not permitted. That is, in the contracted machine, the controller 61 is configured not to receive the instruction instructing to initialize the toner memories 42 of the toner cartridges 4 and the drum memories 22 of the drum cartridges 20.

With the above method, in the image forming apparatus 1 which is not a contracted machine, the first consumable memory and the second consumable memory can be initialized easily, thereby contributing to promotion of recycling. For example, initialization for the toner memory 42 in a toner cartridge 4 (the first consumable memory or the second consumable memory) and the drum memory 22 in a drum cartridge 20 (the first consumable memory or the second consumable memory) can be performed easily.

Also, initialization for the toner memory 42 in the yellow toner cartridge 4 (the first consumable memory or the second consumable memory) and the toner memory 42 in the black toner cartridge 4 (the first consumable memory or the second consumable memory) can be performed easily.

Accordingly, the user can easily perform initialization for multiple toner memories 42 and drum memories 22 with a single instruction using the image forming apparatus 1 which is not a contracted machine. On the other hand, in the contracted machine, use of the recycled cartridge as the subscription cartridge is prevented. This operation can avoid a situation where a printing quality is not warranted in the image forming apparatus 1 for which an agreement is reached. That is, an added value of the subscription service that warrants the printing quality is not impaired.

Process to Check Whether or Not Initialization is Possible

Figure 9:
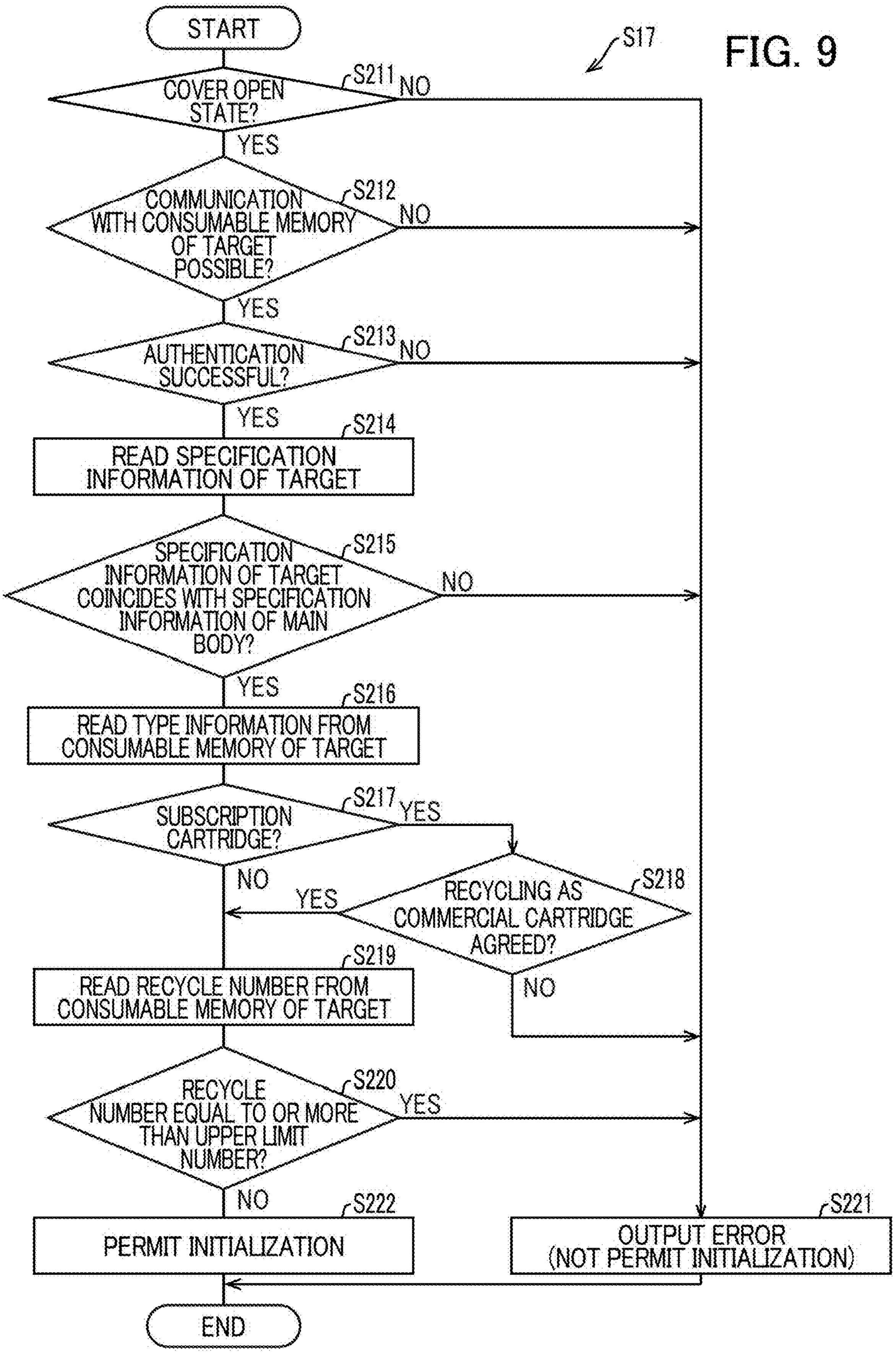
FIG. 9 is a flowchart illustrating process flow to check whether or not initialization is possible in FIG. 7.

FIG. 9 is a flowchart illustrating process flow to check whether or not the initialization is possible that corresponds to S17 illustrated in FIG. 7.

In S211 the controller 61 determines via the closure sensor 12 whether or not the cover 11 is in its open state. Specifically, the controller 61 determines whether a signal indicating that the cover 11 is at the closed position is not inputted from the closure sensor 12. When a signal indicating that the cover 11 is at the closed position is inputted from the closure sensor 12, the controller 61 determines that the cover 11 is closed, and advances the process from NO in S211 to S221 (described later). However, when a signal indicating that the cover 11 is at the closed position is not inputted from the closure sensor 12, the controller 61 determines that the cover 11 is in the open state, and advances the process from YES in S211 to S212.

In S212 the controller 61 attempts to communicate with the toner memory 42 of the toner cartridge 4 or the drum memory 22 of the drum cartridge 20 subjected to the initialization target in S17. When the controller 61 determines that communication with the toner memory 42 or the drum memory 22 is not possible, for example, that information cannot be read from the toner memory 42 or the drum memory 22, the controller 61 advances the process from NO in S212 to S221 (described later). However, when the controller 61 determines that communication with the toner memory 42 or the drum memory 22 is possible, the controller 61 advances the process from YES in S212 to S213.

In S213 the controller 61 authenticates the toner cartridge 4 or the drum cartridge 20 that is the subject of the initialization in S17. There is no particular restriction on the method of authenticating the toner cartridge 4 or the drum cartridge 20.

For example, when the model number of the toner cartridge 4 or the drum cartridge 20 is compatible with the model number of the image forming apparatus 1, the controller 61 may determine that the toner cartridge 4 or the drum cartridge 20 was successfully authenticated. On the other hand, when the model number of the toner cartridge 4 or the drum cartridge 20 is not compatible with the model number of the image forming apparatus 1, the controller 61 may determine that the authentication of the toner cartridge 4 or the drum cartridge 20 failed.

When the controller 61 could authenticate the toner cartridge 4 or the drum cartridge 20, the controller 61 advances the process from YES in S213 to S214. However, when the controller 61 could not authenticate the toner cartridge 4 or the drum cartridge 20, the controller 61 advances the process from NO in S213 to S221 (described later). As an alternative, the controller 61 may skip the process of S213.

In S214 the controller 61 reads the specification information 424 from the toner memory 42 when the subject of initialization in S17 is a toner cartridge 4. Alternatively, the controller 61 reads the specification information 222 from the drum memory 22 when the subject of initialization in S17 is a drum cartridge 20.

In S215, the controller 61 determines whether the read specification information 424 or specification information 222 coincides with the specification information 628 of the image forming apparatus 1 stored in the main memory 62. When the two pieces of specification information coincide with each other, the controller 61 advances the process from YES in S215 to S216. On the other hand, when the two pieces of specification information do not coincide with each other, the controller 61 advances the process from NO in S215 to S221 (described later). In another example, the controller 61 may skip the processes of S214 and S215.

In S216 the controller 61 reads the type information 425 from the toner memory 42 when the subject of initialization in S17 is a toner cartridge 4. Alternatively, the controller 61 reads the type information 223 from the drum memory 22 when the subject of initialization in S17 is a drum cartridge 20.

In S217, the controller 61 determines whether the read type information 425 or type information 223 indicates the type "subscription" or the type "commercial". When the type information 425 or the type information 223 indicates the type "subscription", the controller 61 advances the process from YES in S217 to S218. When the type information 425 or the type information 223 indicates "commercial", the controller 61 advances the process from NO in S217 to S219.

In S218 (the third display process, the third display step), the controller 61 determines whether or not the user agrees that the toner cartridge 4 or the drum cartridge 20 which is the subscription cartridge will be recycled as a commercial cartridge.

For example, the controller 61 causes the display 65 to display thereon an initialization selection screen (the second selection screen) which is related to the subscription cartridge. The initialization selection screen includes a second warning for notifying the user that, when the subscription cartridge is initialized, thereafter the subscription cartridge is recognized as a commercial cartridge. In other words, the second warning is included to inform the user that once the toner cartridge information 420 or the drum cartridge information 220, particularly each of the first life information and the second life information, of the subscription cartridge is initialized, thereafter the subscription cartridge is recognized as a commercial cartridge.

The initialization selection screen further includes the second UI component for the user to select whether to initialize or not the toner cartridge information 420 or the drum cartridge information 220, which includes lifetime information. As described above, the second UI component is configured to allow the user to select one of the "Initialize" button and "Do not initialize" button. The button corresponding to "Initialize" denotes that the user wishes to initialize the first life information and the second life information. The button corresponding to "Do not initialize" denotes that the user does not wish to initialize the first life information and the second life information.

In the above example, the controller 61 determines that the user agrees with the recycling of the subscription cartridge as a commercial cartridge when the button corresponding to "Initialize" was selected. In this case, the controller 61 advances the process from YES in S218 to S219.

On the other hand, the controller 61 determines that the user does not agree when the button corresponding to "Do not initialize" was selected. In this case, the controller 61 advances the process from NO in S218 to S221 (described later).

In S219, when the initialization target in S17 is a toner cartridge 4, the controller 61 reads the recycle number 429 from the toner memory 42. Alternatively, when the initialization target in S17 is a drum cartridge 20, the controller 61 reads the recycle number 226 from the drum memory 22.

In S220 (the determination process, the determination step), the controller 61 compares the read recycle number 429 (the initialization number) or recycle number 226 (the initialization number) with the upper limit information 625 (the upper limit of the number of times) stored in the main memory 62. That is, the controller 61 checks whether or not the recycle number 429 or the recycle number 226 reaches the upper limit of the number of times indicated by the upper limit information 625.

When the read recycle number 429 or recycle number 226 is equal to or more than the upper limit of the number of times, the controller 61 advances the process from YES in S220 to S221. That is, the initialization of the toner cartridge information 420 beyond the upper limit of the number of times of recycling is prohibited. On the other hand, when the read recycle number 429 or recycle number 226 is less than the upper limit of the number of times, the controller 61 advances the process from NO in S220 to S222.

In S221 the controller 61 outputs an error and does not permit initialization of the toner cartridge information 420 in the toner cartridge 4 or the drum cartridge information 220 in the drum cartridge 20 as the initialization target in S17.

In S222 the controller 61 determines that the toner cartridge 4 or the drum cartridge 20 subjected to the target of initialization in S17 meets the requirements for recycling. The controller 61 then permits the toner cartridge information 420 in the toner cartridge 4 or the drum cartridge information 220 in the drum cartridge 20, which is the target of initialization in S17, to be initialized.

Process to Initialize Cartridge Information

Figure 10:
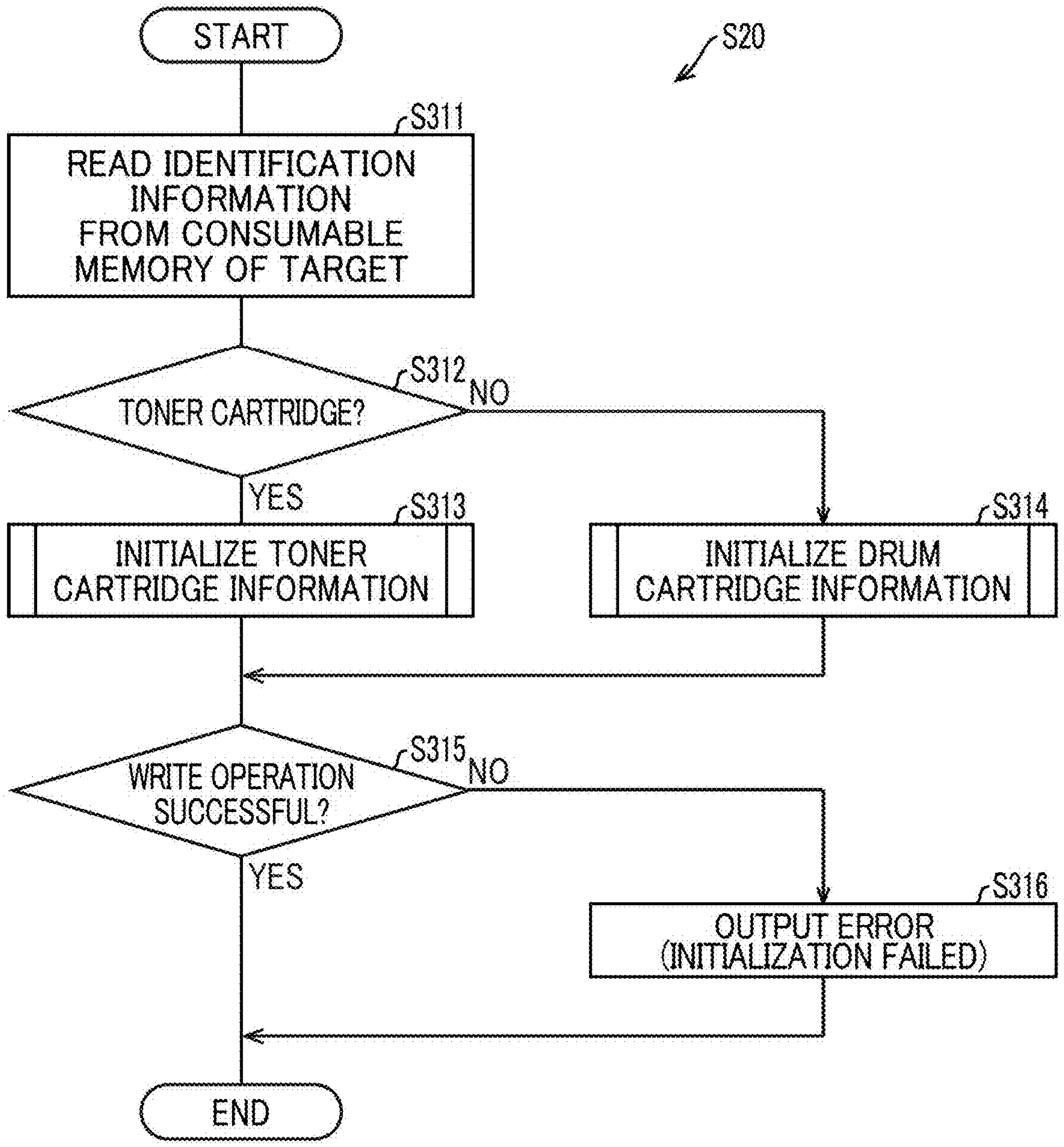
FIG. 10 is a flowchart illustrating process flow to perform initialization in FIG. 7.

FIG. 10 is a flowchart illustrating process flow for performing initialization that corresponds to S20 illustrated in FIG. 7.

In S311 (the acquisition process, the acquisition step), the controller 61 reads the toner ID 421 (the first identification information) from the toner memory 42 when the initialization target in S20 is a toner cartridge 4. Alternatively, the controller 61 reads the drum ID 221 (the second identification information) from the drum memory 22 when the initialization target in S20 is a drum cartridge 20.

In S312, the controller 61 determines whether the toner ID 421 or the drum ID 221 read above includes "TON" representing a toner cartridge 4. When determining that the toner ID 421 or the drum ID 221 read above contains "TON" representing a toner cartridge 4, the controller 61 determines that the initialization target in S20 is a toner cartridge 4. The controller 61 then advances the process from YES in S312 to S313.

On the other hand, when determining that the toner ID 421 or the drum ID 221 read above does not contain "TON" representing a toner cartridge 4, the controller 61 determines that the initialization target in S20 is not a toner cartridge 4. That is, the controller 61 determines that the initialization target in S20 is a drum cartridge 20, and advances the process from NO in S312 to S314.

In S313 (the initialization process, the initialization step), the controller 61 initializes the toner cartridge information 420 stored in the toner memory 42 of the toner cartridge 4 which is the initialization target in S20, and subsequently advances to the process in S315. The detailed process flow in S313 will be described later in detail with reference to another drawing.

In S314 (the initialization process, the initialization step), the controller 61 initializes the drum cartridge information 220 stored in the drum memory 22 of the drum cartridge 20 which is the initialization target in S20, and subsequently advances to the process in S315. The detailed process flow in S314 will be described later in detail with reference to another drawing.

When the initialization target in S20 is a toner cartridge 4, in S315 the controller 61 determines whether or not the read operations from the toner memory 42 and the write operations in the toner memory 42 were successful. When all of the read operations and the write operations were successful, the controller 61 advances the process from YES in S315 to end the initialization process. On the other hand, when any read operation or write operation failed in either of the above steps, the controller 61 advances the process from NO in S315 to S316.

Alternatively, when the initialization target in S20 is a drum cartridge 20, the controller 61 determines whether the read operations from the drum memory 22 and the write operations in the drum memory 22 were successful. When all of the read operations and the write operations were successful, the controller 61 advances the process from YES in S315 to end the initialization process. However, when any read operation or write operation failed in either of the above steps, the controller 61 advances the process from NO in S315 to S316.

In S316 the controller 61 outputs an error because the toner cartridge information 420 or the drum cartridge information 220 could not be initialized.

Process to Initialize Toner Cartridge Information 420

Figure 11:
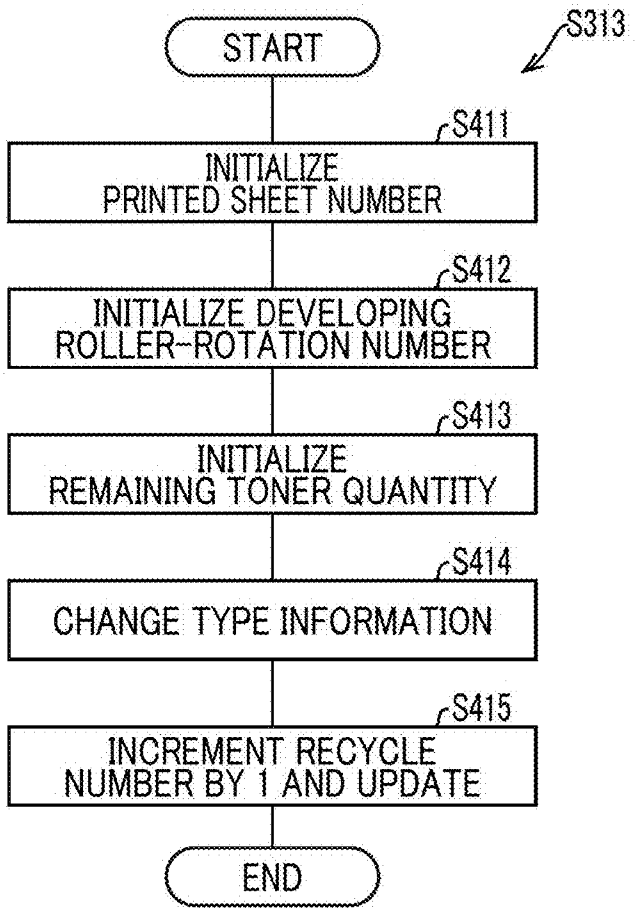
FIG. 11 is a flowchart illustrating process flow to initialize the toner cartridge information in FIG. 10.

FIG. 11 is a flowchart illustrating process flow for initializing the toner cartridge information 420 that corresponds to S313 illustrated in FIG. 10.

In S411 (the initialization process, the initialization step), the controller 61 initializes the printed sheet number 426 stored in the toner memory 42. Specifically, the controller 61 sets the printed sheet number 426, which is incremented up to a prescribed sheet number, to 0.

In S412 (the initialization process, the initialization step), the controller 61 initializes the developing roller-rotation number 427 stored in the toner memory 42. Specifically, the controller 61 sets the developing roller-rotation number 427, which is incremented up to a prescribed rotation number, to 0.

In S413 (the initialization process, the initialization step), the controller 61 initializes the remaining toner quantity 428 stored in the toner memory 42. Specifically, the controller 61 sets the remaining toner quantity 428 whose value is reduced during consumption of the toner to an initial value. That is, the controller 61 sets the remaining toner quantity 428 to a FULL value (a value indicating the capacity of the cartridge) of the capacity such as "FULL", "100%", and the like. The FULL value corresponding to each capacity may be stored in advance in the main memory 62 or may be stored in advance in the toner memory 42.

In S414 (the change process, the change step), the controller 61 changes the type information 425 stored in the toner memory 42. Specifically, the controller 61 changes the type information 425 from the "subscription" to "commercial" so that the toner cartridge 4 after recycling is recognized as a commercial cartridge, not a subscription cartridge.

Note that, in the process to check illustrated in FIG. 9, the controller 61 executes the process of S414 described above after the process flow passes through YES in S218. When the process flow does not pass through YES in S218, the process of S414 described above will be skipped.

In S415 (the write process, the write step), the controller 61 updates the recycle number 429 stored in the toner memory 42 by incrementing the recycle number 429 by 1. Thereafter, the controller 61 ends the process to initialize the toner cartridge information 420.

Process to Initialize Drum Cartridge Information 220

Figure 12:
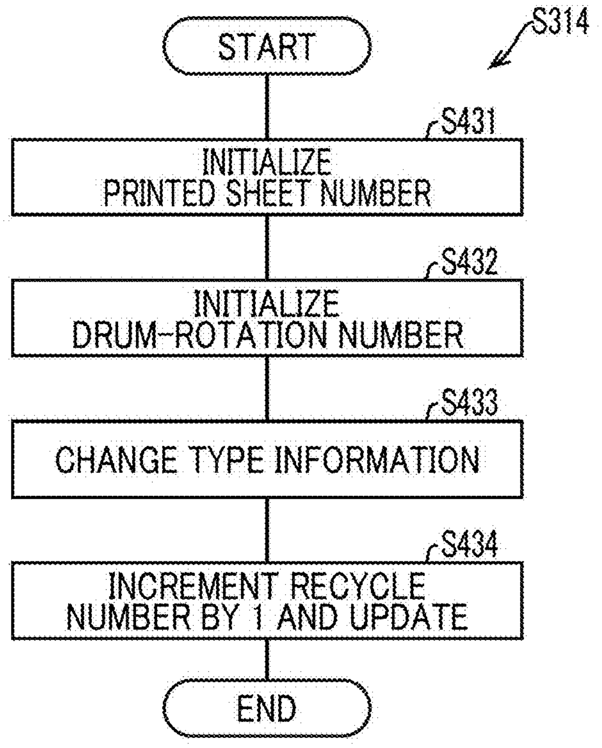
FIG. 12 is a flowchart illustrating process flow to initialize the drum cartridge information in FIG. 10.

FIG. 12 is a flowchart illustrating process flow to initialize the drum cartridge information 220 that corresponds to S314 illustrated in FIG. 10.

In S431 (the initialization process, the initialization step), the controller 61 initializes the printed sheet number 224 stored in the drum memory 22. Specifically, the controller 61 sets the printed sheet number 224, which is incremented up to a prescribed sheet number, to 0.

In S432 (the initialization process, the initialization step), the controller 61 initializes the drum-rotation number 225 stored in the drum memory 22. Specifically, the controller 61 sets the drum-rotation number 225, which is incremented up to a prescribed rotation number, to 0.

In S433 (the change process, the change step), the controller 61 changes the type information 223 stored in the drum memory 22. Specifically, the controller 61 changes the type information 223 from "subscription" to "commercial" so that the drum cartridge 20 after recycling is recognized as a commercial cartridge rather than a subscription cartridge.

Here, the controller 61 executes the process of S433 described above after the process flow passes through YES in S218 of the checking process illustrated in FIG. 9. The process of S433 is omitted when the process flow does not pass through YES in S218.

In S434 (the write process, the write step), the controller 61 updates the recycle number 226 stored in the drum memory 22 by incrementing the recycle number 226 by 1, and subsequently ends the process to initialize the drum cartridge information 220.

MODIFICATIONS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification 1

In S17 to S19 of FIG. 7, for example, the controller 61 may execute the process of S23 only with respect to toner cartridges 4 and drum cartridges 20 for which an error was detected in S18. In other words, the controller 61 may cause the display 65 to display thereon an error message to notify the user that initialization has not been performed only for those toner cartridges 4 and drum cartridges 20 for which an error was detected.

In the error screen, the controller 61 may also display a message indicating which of the toner cartridges 4 and the drum cartridges 20 resulted in an error being detected, for example, "Yellow toner cartridge". The controller 61 may also display the reason that the requirements for recycling have not been not met, such as "The recycling number exceeds the upper limit of the number of times" or "The specification information does not coincide with the specification information of the image forming apparatus 1".

Moreover, the controller 61 may permit the initialization of toner cartridges 4 and drum cartridges 20 for which an error was not detected in S18 and may execute the process in S20 to S23 of FIG. 7 on those cartridges.

Modification 2

In S20 to S22 of FIG. 7, for example, the controller 61 may execute the process of S23 only with respect to toner cartridges 4 and drum cartridges 20 for which an error in read operations or write operations was detected in S21. In the error screen, the controller 61 may also display a message indicating which of the cartridges among the toner cartridges 4 and the drum cartridges 20 could not be initialized, for example, "Yellow toner cartridge". Then, the controller 61 may cause the display 65 to display thereon the successful initialization screen to notify the user that initialization was successful with toner cartridges 4 and drum cartridges 20 for which an error was not detected.

Modification 3

The controller 61 may be capable of communicating simultaneously with all of the toner memories 42 and the drum memories 22 through the corresponding connectors 101 and 102, for example. In this case, in S17 of FIG. 7, the controller 61 may simultaneously check whether or not initialization is possible for all of the toner cartridges 4 and the drum cartridges 20 stored in the main memory 62 in S14. In S20 of FIG. 7, the controller 61 may also simultaneously initialize all of the toner cartridges 4 and the drum cartridges 20 for which initialization was permitted in S17.

Modification 4

The developing roller 41 in the above embodiment may be provided at the toner cartridge 4, or may be provided at the drum cartridge 20 as long as the developing roller 41 can achieve the functions described in the above embodiment. Further, in the above embodiment, each of the toner cartridges 4 is inserted through the opening of the corresponding cartridge retaining part 13 together with the corresponding drum cartridge 20 in a state where the toner cartridge 4 is attached to the corresponding drum cartridge 20. That is, in the above embodiment, the toner cartridge 4 and the drum cartridge 20 are separated cartridges. However, the toner cartridge 4 and the drum cartridge 20 may be formed integrally as a single cartridge.

Modification 5

The image forming apparatus 1 may be an inkjet printer. In a case where the image forming apparatus 1 is an inkjet printer, an ink cartridge is attached to the cartridge retaining part 13 of the image forming apparatus 1 in place of the drum cartridge 20 and the toner cartridge 4 described in the above embodiment. Note that the number of ink cartridges attached to the image forming apparatus 1 is not particularly limited. For example, a total of four ink cartridges respectively corresponding to four colors of cyan, magenta, yellow, and black may be attached to the image forming apparatus 1.

The ink cartridge includes a cartridge casing filled with ink as a printing material, and an ink memory storing therein ink cartridge information. The ink cartridge information includes, for example, an ink ID, capacity information, color information, specification information, type information, a printed sheet number (the first lifetime information), a remaining ink quantity (the first lifetime information), and a recycle number.

The ink ID is identification information for the ink cartridge, and is information included in the ink cartridge information in place of the toner ID 421 in the above embodiment. The remaining ink quantity is information indicating the remaining quantity of ink in the ink cartridge and is information included in the ink cartridge information in place of the remaining toner quantity 428 of the above embodiment. The capacity information, the color information, the specification information, the type information, the printed sheet number, and the recycle number are information respectively corresponding to information having the same name in the toner cartridge information 420 in the above embodiment. That is, "toner" in the toner cartridge information 420 of the above embodiment is replaced with "ink", and "toner cartridge" of the above embodiment is replaced with "ink cartridge".

Note that an agitator for agitating ink may be included in the cartridge casing of the ink cartridge. The agitator operates in accordance with an instruction from the controller 61 in a state where the ink cartridge is attached to the image forming apparatus 1.

Even in a case where the image forming apparatus 1 is an inkjet printer, each process flow is the same as that illustrated in the flowcharts described in the above embodiment. Specifically, in a case where the image forming apparatus 1 is an inkjet printer, "toner cartridge 4" and "toner memory 42" in the above embodiment may be replaced with "ink cartridge" and "ink memory", respectively. Also, the "toner cartridge information 420" in the above embodiment may be replaced with "ink cartridge information".

Further, various information included in the toner cartridge information 420 of the above embodiment may be replaced with corresponding information in the ink cartridge information. Since the developing roller-rotation number 427 is not included in the ink cartridge information, various processes related to the developing roller-rotation number 427 may be omitted in the image forming apparatus 1 according to the present modification. The image forming apparatus 1 according to the present modification exhibits the effects the same as the image forming apparatus 1 according to the above embodiment.

Modification 6

A printing material used in the image forming apparatus 1 is not limited to paper. For example, the printing material may be tape. In a case where the printing material is tape, a tape cassette that supplies tape is attached to the image forming apparatus 1, and the image forming apparatus 1 performs printing on the tape conveyed from the tape cassette. In this case, the image forming apparatus 1 may be a laser printer or an inkjet printer.

Modification 7

The image forming apparatus 1 may be an MFP (Multifunction Printer) also having other functions such as a scanning or a facsimile function. In a case where the image forming apparatus 1 is an MFP, the image forming apparatus 1 can execute various processes described in the above embodiment similar to the image forming apparatus 1 in the above embodiment. The image forming apparatus 1 according to the present modification exhibits the effects the same as the image forming apparatus 1 in the above embodiment.

Implementation Through Software

The functions of the image forming apparatus 1 can be implemented by a program for causing a computer to function as the image forming apparatus 1 and causing the computer to function as each control block of the image forming apparatus 1 (particularly, the controller 61).

In this case, the image forming apparatus 1 includes a computer possessing at least one controller (for example, a processor) and at least one storage device (for example, a memory) as a hardware required for executing the program described above. Each function described in the above embodiment is implemented by executing the program described above using the controller and the storage device described above.

The program may be stored in one or more non-transitory computer-readable storage media. These storage media may be provided at the image forming apparatus 1 but need not be. In the latter case, the program may be supplied to the image forming apparatus 1 through any wired or wireless transmission medium.

Further, all or a part of the functions of the control blocks described above can also be implemented by logic circuits. For example, an integrated circuit in which logic circuits that function as the above control blocks are provided falls within the scope of the present disclosure. Alternatively, the functions of the control blocks described above can be implemented by a quantum computer, for example.

Further, the processes described in the above embodiment may be executed by an AI (Artificial Intelligence). In this case, the AI may operate on the above controller or may operate on another device (for example, an edge computer, a cloud server, or the like).

REMARKS

The present disclosure is not limited to the embodiment described above, and various modifications may be made thereto within the scope indicated in the claims. Embodiments obtained by appropriately combining technical means respectively disclosed in the different embodiments fall within the technical scope of the present disclosure.

What is claimed is:

1. An image forming apparatus comprising:

a main casing to which a first consumable and a second consumable are attached;

a controller; and a main memory, wherein the first consumable includes a first consumable memory in which first lifetime information is stored, the first lifetime information being related to a service life of the first consumable, wherein the second consumable includes a second consumable memory in which second lifetime information is stored, the second lifetime information being related to a service life of the second consumable, and wherein the controller is configured to perform:

a reception process to receive an instruction instructing to initialize the first lifetime information and the second lifetime information;

an initialization process to initialize the first lifetime information and the second lifetime information in accordance with the received instruction; and a write process to write first initialization information in the first consumable memory and to write second initialization information in the second consumable memory, the first initialization information indicating that the first lifetime information was initialized, the second initialization information indicating that the second lifetime information was initialized.

2. The image forming apparatus according to claim 1, wherein one of the first consumable and the second consumable includes a replacement component.

3. The image forming apparatus according to claim 1, further comprising a display, wherein the controller is configured to further perform:

a first display process to cause the display to display thereon a target selection screen, the target selection screen being a screen for a user to select the first consumable and the second consumable subjected to a target of the initialization process, and wherein the controller performs the initialization process for the first consumable and the second consumable selected as the target of the initialization process through the target selection screen.

4. The image forming apparatus according to claim 1, wherein first identification information is further stored in the first consumable memory, the first identification information indicating whether the first consumable is a toner cartridge or a drum cartridge, wherein the controller is configured to further perform:

an acquisition process to acquire the first identification information, wherein, when the first identification information acquired in the acquisition process indicates a toner cartridge, the controller initializes in the initialization process at least one of a remaining toner quantity, a developing roller-rotation number, and a printed sheet number which are stored in the first consumable memory, and wherein, when the first identification information acquired in the acquisition process indicates a drum cartridge, the controller initializes in the initialization process at least one of a drum-rotation number and a printed sheet number which are stored in the first consumable memory.

5. The image forming apparatus according to claim 1, wherein second identification information is further stored in the second consumable memory, the second identification information indicating whether the second consumable is a toner cartridge or a drum cartridge, wherein the controller is configured to further perform:

an acquisition process to acquire the second identification information, wherein, when the second identification information acquired in the acquisition process indicates a toner cartridge, the controller initializes in the initialization process at least one of a remaining toner quantity, a developing roller-rotation number, and a printed sheet number which are stored in the second consumable memory, and wherein, when the second identification information acquired in the acquisition process indicates a drum cartridge, the controller initializes in the initialization process at least one of a drum-rotation number and a printed sheet number which are stored in the second consumable memory.

6. The image forming apparatus according to claim 1, further comprising a display, wherein the controller is configured to further perform:

a second display process to cause the display to display thereon a first warning and a first selection screen in accordance with the instruction, the first warning indicating that a printing quality is not warranted when the first lifetime information and the second lifetime information are initialized, the first selection screen being a screen for a user to select whether to initialize the first lifetime information and the second lifetime information or not, and wherein, when initialization is selected through the first selection screen, the controller performs the initialization process.

7. The image forming apparatus according to claim 1, further comprising a user interface, wherein, in the reception process, the controller receives the instruction instructing to initialize the first lifetime information and the second lifetime information through the user interface.

8. The image forming apparatus according to claim 1, wherein the first initialization information is an initialization number indicating the number of times that the first lifetime information was initialized, wherein the controller is configured to further perform:

a determination process to determine whether or not the initialization number of the first lifetime information indicated by the first initialization information reaches a predetermined upper limit of the number of times, and wherein, when determining in the determination process that the initialization number reaches the predetermined upper limit of the number of times, the controller does not perform the initialization process.

9. The image forming apparatus according to claim 1, wherein at least one of first consumption information and first remaining quantity information is stored in the first consumable memory as the first lifetime information, the first consumption information being information for identifying a degree to which the first consumable is used, the first remaining quantity information being information for identifying a quantity of a material remaining in the first consumable.

10. The image forming apparatus according to claim 9, wherein the first consumable is a toner cartridge, wherein at least one of a printed sheet number, a developing roller-rotation number, and a consumption toner quantity is stored in the first consumable memory as the first consumption information, and wherein, in the initialization process, the controller sets a value of the first consumption information to 0.

11. The image forming apparatus according to claim 9, wherein the first consumable is a drum cartridge, wherein at least one of a printed sheet number and a drum-rotation number is stored in the first consumable memory as the first consumption information, and wherein, in the initialization process, the controller sets a value of the first consumption information to 0.

12. The image forming apparatus according to claim 9, wherein the first consumable is a cartridge accommodating therein a printing material, wherein a value indicating a capacity of the cartridge is stored in the main memory or the first consumable memory, wherein a remaining printing material quantity is stored in the first consumable memory as the first remaining quantity information, and wherein, in the initialization process, the controller rewrites a value of the remaining printing material quantity to the value indicating the capacity which is stored in the main memory or the first consumable memory.

13. The image forming apparatus according to claim 1, wherein mode information is stored in the main memory, the mode information indicating whether the image forming apparatus is in a subscription mode indicating that an agreement is reached for the image forming apparatus, and wherein, when the mode information indicates the subscription mode, the controller does not perform the reception process.

14. The image forming apparatus according to claim 1, wherein first type information is stored in the first consumable memory, the first type information indicating whether the first consumable is a subscription consumable or a normal consumable, the subscription consumable being a consumable that can be used in an image forming apparatus for which an agreement is reached, the normal consumable being a consumable that can be used both in an image forming apparatus for which an agreement is reached and in an image forming apparatus for which an agreement is not reached, and wherein the controller is configured to further perform:

a change process to change the first type information to the normal consumable in accordance with the instruction when the first type information indicates a subscription consumable.

15. The image forming apparatus according to claim 14, further comprising a display, wherein, when the first type information indicates a subscription consumable, the controller is configured to further perform:

a third display process to cause the display to display thereon a second warning and a second selection screen in accordance with the instruction, the second warning indicating that the subscription consumable is recognized as the normal consumable when the first lifetime information is initialized, the second selection screen being a screen for a user to select whether to initialize the first lifetime information or not, and wherein, when initialization is selected through the second selection screen, the controller performs the initialization process.

16. An initialization method of initializing a first consumable memory included in a first consumable and a second consumable memory included in a second consumable, the initialization method comprising:

a reception step, by an image forming apparatus, of receiving an instruction instructing to initialize first lifetime information stored in the first consumable memory of the first consumable attached to a main casing of the image forming apparatus and second lifetime information stored in the second consumable memory of the second consumable attached to the main casing, the first lifetime information being related to a service life of the first consumable, the second lifetime information being related to a service life of the second consumable;

an initialization step, by the image forming apparatus, of initializing the first lifetime information and the second lifetime information in accordance with the received instruction; and a write step, by the image forming apparatus, of writing first initialization information in the first consumable memory and of writing second initialization information in the second consumable memory, the first initialization information indicating that the first lifetime information was initialized, the second initialization information indicating that the second lifetime information was initialized.

17. The initialization method according to claim 16, wherein one of the first consumable and the second consumable includes a replacement component.

18. The initialization method according to claim 16, further comprising:

a first display step, by the image forming apparatus, of causing a display of the image forming apparatus to display thereon a target selection screen, the target selection screen being a screen for a user to select the first consumable and the second consumable subjected to a target of initialization in the initialization step, wherein the image forming apparatus performs the initialization step for the first consumable and the second consumable selected as the target of the initialization in the initialization step through the target selection screen.

19. The initialization method according to claim 16, wherein first identification information is further stored in the first consumable memory, the first identification information indicating whether the first consumable is a toner cartridge or a drum cartridge, the initialization method further comprising:

an acquisition step, by the image forming apparatus, of acquiring the first identification information stored in the first consumable memory, wherein, when the first identification information acquired in the acquisition step indicates a toner cartridge, the image forming apparatus initializes in the initialization step at least one of a remaining toner quantity, a developing roller-rotation number, and a printed sheet number which are stored in the first consumable memory, and wherein, when the first identification information acquired in the acquisition step indicates a drum cartridge, the image forming apparatus initializes in the initialization step at least one of a drum-rotation number and a printed sheet number which are stored in the first consumable memory.

20. The initialization method according to claim 16, wherein second identification information is further stored in the second consumable memory, the second identification information indicating whether the second consumable is a toner cartridge or a drum cartridge, the initialization method further comprising:

an acquisition step, by the image forming apparatus, of acquiring the second identification information stored in the second consumable memory, wherein, when the second identification information acquired in the acquisition step indicates a toner cartridge, the image forming apparatus initializes in the initialization step at least one of a remaining toner quantity, a developing roller-rotation number, and a printed sheet number which are stored in the second consumable memory, and wherein, when the second identification information acquired in the acquisition step indicates a drum cartridge, the image forming apparatus initializes in the initialization step at least one of a drum-rotation number and a printed sheet number which are stored in the second consumable memory.

21. The initialization method according to claim 16, further comprising:

a second display step, by the image forming apparatus, of causing a display of the image forming apparatus to display thereon a first warning and a first selection screen in accordance with the instruction, the first warning indicating that a printing quality is not warranted when the first lifetime information and the second lifetime information are initialized, the first selection screen being a screen for a user to select whether to initialize the first lifetime information and the second lifetime information or not, wherein, when initialization is selected through the first selection screen, the image forming apparatus performs the initialization step.

22. The initialization method according to claim 16, wherein, in the reception step, the image forming apparatus receives the instruction instructing to initialize the first lifetime information and the second lifetime information through a user interface of the image forming apparatus.

23. The initialization method according to claim 16, wherein the first initialization information is an initialization number indicating the number of times that the first lifetime information was initialized, the initialization method further comprising:

a determination step, by the image forming apparatus, of determining whether or not the initialization number of the first lifetime information indicated by the first initialization information reaches a predetermined upper limit of the number of times, wherein, when determining in the determination step that the initialization number reaches the predetermined upper limit of the number of times, the image forming apparatus does not perform the initialization step.

24. The initialization method according to claim 16, wherein at least one of first consumption information and first remaining quantity information is stored in the first consumable memory as the first lifetime information, the first consumption information being information for identifying a degree to which the first consumable is used, the first remaining quantity information being information for identifying a quantity of a material remaining in the first consumable.

25. The initialization method according to claim 24, wherein the first consumable is a toner cartridge, wherein at least one of a printed sheet number, a developing roller-rotation number, and a consumption toner quantity is stored in the first consumable memory as the first consumption information, and wherein, in the initialization step, the image forming apparatus sets a value of the first consumption information to 0.

26. The initialization method according to claim 24, wherein the first consumable is a drum cartridge, wherein at least one of a printed sheet number and a drum-rotation number is stored in the first consumable memory as the first consumption information, and wherein, in the initialization step, the image forming apparatus sets a value of the first consumption information to 0.

27. The initialization method according to claim 24, wherein the first consumable is a cartridge accommodating therein a printing material, wherein a value indicating a capacity of the cartridge is stored in a main memory of the image forming apparatus or the first consumable memory, wherein a remaining printing material quantity is stored in the first consumable memory as the first remaining quantity information, and wherein, in the initialization step, the image forming apparatus rewrites a value of the remaining printing material quantity to the value indicating the capacity which is stored in the main memory or the first consumable memory.

28. The initialization method according to claim 16, wherein mode information is stored in a main memory of the image forming apparatus, the mode information indicating whether the image forming apparatus is in a subscription mode indicating that an agreement is reached for the image forming apparatus, and wherein, when the mode information indicates the subscription mode, the image forming apparatus does not perform the reception step.

29. The initialization method according to claim 16, wherein first type information is stored in the first consumable memory, the first type information indicating whether the first consumable is a subscription consumable or a normal consumable, the subscription consumable being a consumable that can be used in an image forming apparatus for which an agreement is reached, the normal consumable being a consumable that can be used both in an image forming apparatus for which an agreement is reached and in an image forming apparatus for which an agreement is not reached, the initialization method further comprising:

a change step, by the image forming apparatus, of changing the first type information to the normal consumable in accordance with the instruction when the first type information indicates a subscription consumable.

30. The initialization method according to claim 29, further comprising:

a third display step, by the image forming apparatus, of causing a display of the image forming apparatus to display thereon a second warning and a second selection screen in accordance with the instruction when the first type information indicates a subscription consumable, the second warning indicating that the subscription consumable is recognized as the normal consumable when the first lifetime information is initialized, the second selection screen being a screen for a user to select whether to initialize the first lifetime information or not, wherein, when initialization is selected through the second selection screen, the image forming apparatus performs the initialization step.

* * * * *